(12) United States Patent
Yu et al.

(10) Patent No.: US 11,884,040 B2
(45) Date of Patent: *Jan. 30, 2024

(54) LIGHT WEIGHT GYPSUM BOARD

(71) Applicant: United States Gypsum Company, Chicago, IL (US)

(72) Inventors: Qiang Yu, Grayslake, IL (US); Weixin D. Song, Chicago, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,025

(22) Filed: Apr. 19, 2022

(65) Prior Publication Data

US 2022/0242092 A1 Aug. 4, 2022

Related U.S. Application Data

(63) Continuation of application No. 16/518,241, filed on Jul. 22, 2019, now Pat. No. 11,338,548, which is a
(Continued)

(51) Int. Cl.
| | | |
|---|---|---|
| *C04B 28/14* | (2006.01) | |
| *B32B 13/08* | (2006.01) | |
| *B32B 3/26* | (2006.01) | |
| *B32B 5/02* | (2006.01) | |
| *B32B 13/14* | (2006.01) | |
| *B32B 17/02* | (2006.01) | |

(Continued)

(52) U.S. Cl.
CPC ............... *B32B 13/08* (2013.01); *B32B 3/26* (2013.01); *B32B 5/02* (2013.01); *B32B 13/14* (2013.01); *B32B 17/02* (2013.01); *B32B 29/00* (2013.01); *C04B 28/14* (2013.01); *C04B 2111/0062* (2013.01); *C04B 2111/40* (2013.01); *Y10T 428/249968* (2015.04)

(58) Field of Classification Search
CPC ........... B32B 3/26; B32B 13/08; B32B 29/00; C04B 28/14; C04B 24/226; C04B 24/383; C04B 2111/40; C04B 2111/0062; C04B 2103/408; Y10T 428/249968
USPC ..... 106/772, 778, 680; 156/39; 428/70, 158, 428/703
See application file for complete search history.

(56) References Cited

U.S. PATENT DOCUMENTS

| 1,500,452 A | 7/1924 | Haggerty |
| 1,511,500 A | 10/1924 | Brookby et al. |

(Continued)

FOREIGN PATENT DOCUMENTS

| AU | 486746 | 11/1975 |
| AU | 638696 B2 | 7/1993 |

(Continued)

OTHER PUBLICATIONS

U.S. Appl. No. 60/688,839, Yu et al., filed Jun. 9, 2005.
(Continued)

*Primary Examiner* — Ruiyun Zhang
(74) *Attorney, Agent, or Firm* — Leydig, Voit & Mayer, Ltd.; Philip T. Petti; Pradip K. Sahu

(57) ABSTRACT

This invention provides gypsum wallboards with a unique microstructure where the walls between voids are enhanced in thickness and strength to substantially improve the strength and handling properties of the wallboards. A method of making lightweight gypsum wallboards is also provided.

20 Claims, 10 Drawing Sheets

Related U.S. Application Data continuation of application No. 15/802,048, filed on Nov. 2, 2017, now Pat. No. 10,406,779, which is a continuation of application No. 11/906,479, filed on Oct. 2, 2007, now Pat. No. 9,840,066, which is a continuation-in-part of application No. 11/592,481, filed on Nov. 2, 2006, now Pat. No. 9,802,866, which is a continuation-in-part of application No. 11/449,177, filed on Jun. 7, 2006, now Pat. No. 7,731,794, and a continuation-in-part of application No. 11/445,906, filed on Jun. 2, 2006, now abandoned.

(60) Provisional application No. 60/688,839, filed on Jun. 9, 2005.

(51) Int. Cl.
*B32B 29/00* (2006.01)
*C04B 111/00* (2006.01)
*C04B 111/40* (2006.01)

(56) References Cited

U.S. PATENT DOCUMENTS

| | | | |
|---|---|---|---|
| 1,702,729 A | 2/1929 | Hite |
| 1,769,519 A | 7/1930 | King |
| 1,868,671 A | 7/1932 | Nelson |
| 1,937,472 A | 11/1933 | Ericson |
| 1,953,589 A | 4/1934 | Camp |
| 1,971,900 A | 8/1934 | Cerveny et al. |
| 2,078,199 A | 4/1937 | King |
| 2,083,961 A | 6/1937 | New |
| 2,207,339 A | 7/1940 | Camp |
| 2,213,603 A | 9/1940 | Young et al. |
| 2,319,637 A | 5/1943 | Schopmeyer et al. |
| 2,322,194 A | 6/1943 | King |
| 2,340,535 A | 2/1944 | Jenkins |
| 2,342,574 A | 2/1944 | Denning |
| 2,388,543 A | 11/1945 | Hoggatt |
| 2,516,632 A | 6/1950 | Kesler et al. |
| 2,526,066 A | 10/1950 | Croce |
| 2,698,818 A | 1/1955 | Staerkle et al. |
| 2,733,238 A | 1/1956 | Kerr et al. |
| 2,744,022 A | 5/1956 | Croce |
| 2,803,575 A | 8/1957 | Riddell et al. |
| 2,845,417 A | 7/1958 | Kesler et al. |
| 2,853,394 A | 9/1958 | Riddell et al. |
| 2,871,146 A | 1/1959 | Etheridge |
| 2,884,413 A | 4/1959 | Kerr et al. |
| 2,894,859 A | 7/1959 | Wimmer et al. |
| 2,940,505 A | 6/1960 | Brothers et al. |
| 2,965,528 A | 12/1960 | Loechl |
| 3,179,529 A | 4/1965 | Hikey et al. |
| 3,260,027 A | 7/1966 | Page et al. |
| 3,359,146 A | 12/1967 | Lane et al. |
| 3,382,636 A | 5/1968 | Green |
| 3,423,238 A | 1/1969 | Weiland |
| 3,454,456 A | 7/1969 | Willey |
| 3,459,571 A | 8/1969 | Shannon |
| 3,513,009 A | 5/1970 | Sauer et al. |
| 3,573,947 A | 4/1971 | Kinkade |
| 3,616,173 A | 10/1971 | Green et al. |
| 3,649,319 A | 3/1972 | Roberts |
| 3,652,294 A | 3/1972 | Marotta et al. |
| 3,666,581 A | 5/1972 | Lane |
| 3,671,264 A | 6/1972 | Drews et al. |
| 3,674,726 A | 7/1972 | Kirk |
| 3,719,513 A | 3/1973 | Bragg et al. |
| 3,797,758 A | 3/1974 | Cherdron |
| 3,830,687 A | 8/1974 | Re et al. |
| 3,839,059 A | 10/1974 | Rothfelder et al. |
| 3,847,630 A | 11/1974 | Compernass et al. |
| 3,853,689 A | 12/1974 | Morrone |
| 3,908,062 A | 9/1975 | Roberts |
| 3,913,571 A | 10/1975 | Bayer et al. |
| 3,920,465 A | 11/1975 | Burkard et al. |
| 3,944,698 A | 3/1976 | Dierks et al. |
| 3,981,831 A | 9/1976 | Markusch et al. |
| 3,988,199 A | 10/1976 | Hillmer et al. |
| 3,989,534 A | 11/1976 | Plunguian et al. |
| 3,993,822 A | 11/1976 | Knauf et al. |
| 4,009,062 A | 2/1977 | Long |
| 4,011,392 A | 3/1977 | Rudolph et al. |
| 4,019,920 A | 4/1977 | Burkard et al. |
| 4,021,257 A | 5/1977 | Bernett |
| 4,048,434 A | 9/1977 | Speakman |
| 4,051,291 A | 9/1977 | Long |
| 4,061,611 A | 12/1977 | Glowaky et al. |
| 4,063,976 A | 12/1977 | Wain et al. |
| 4,073,658 A | 2/1978 | Ohtani et al. |
| 4,097,422 A | 6/1978 | Markusch |
| 4,097,423 A | 6/1978 | Dieterich |
| 4,133,784 A | 1/1979 | Otey et al. |
| 4,159,302 A | 6/1979 | Greve et al. |
| 4,174,230 A | 11/1979 | Hashimoto et al. |
| 4,184,887 A | 1/1980 | Lange et al. |
| 4,190,547 A | 2/1980 | Mahnke et al. |
| 4,195,110 A | 3/1980 | Dierks et al. |
| 4,233,368 A | 11/1980 | Baehr et al. |
| 4,234,345 A | 11/1980 | Fassle |
| 4,237,260 A | 12/1980 | Lange et al. |
| 4,239,716 A | 12/1980 | Ishida et al. |
| 4,247,334 A | 1/1981 | Falcoz et al. |
| 4,265,979 A | 3/1981 | Baehr et al. |
| 4,265,964 A | 5/1981 | Burkhart |
| 4,287,103 A | 9/1981 | Green et al. |
| 4,309,391 A | 1/1982 | O'Neill |
| 4,327,146 A | 4/1982 | White |
| 4,328,178 A | 5/1982 | Kossatz |
| 4,392,896 A | 7/1983 | Sakakibara |
| 4,451,649 A | 5/1984 | Teubner et al. |
| 4,452,978 A | 6/1984 | Eastman |
| 4,455,271 A | 6/1984 | Johnson |
| 4,465,702 A | 8/1984 | Eastman et al. |
| 4,487,864 A | 12/1984 | Bermudez et al. |
| 4,518,652 A | 5/1985 | Willoughby |
| 4,533,528 A | 8/1985 | Zaskalicky |
| 4,573,534 A | 3/1986 | Baker et al. |
| 4,585,685 A | 4/1986 | Forry et al. |
| 4,613,627 A | 9/1986 | Sherman et al. |
| 4,624,574 A | 11/1986 | Mills et al. |
| 4,647,486 A | 3/1987 | Ali |
| 4,654,085 A | 3/1987 | Schinski |
| 4,661,161 A | 4/1987 | Jakacki et al. |
| 4,722,866 A | 2/1988 | Wilson et al. |
| 4,725,477 A | 2/1988 | Kole et al. |
| 4,837,314 A | 6/1989 | Eastman |
| 4,842,786 A | 6/1989 | Betzner |
| 4,853,085 A | 8/1989 | Johnstone et al. |
| 4,939,192 A | 7/1990 | T'sas |
| 4,965,031 A | 10/1990 | Conroy |
| 4,966,739 A | 10/1990 | Stipek et al. |
| 5,037,929 A | 8/1991 | Rajagopalan et al. |
| 5,041,333 A | 8/1991 | Conroy |
| 5,080,717 A | 1/1992 | Young |
| 5,085,929 A | 2/1992 | Bruce et al. |
| 5,093,093 A | 3/1992 | Koslowski |
| 5,116,671 A | 5/1992 | Bruce et al. |
| 5,135,805 A | 8/1992 | Sellers et al. |
| 5,154,874 A | 10/1992 | Koslowski |
| 5,158,612 A | 10/1992 | Savoly et al. |
| 5,171,366 A | 12/1992 | Richards et al. |
| 5,207,830 A | 5/1993 | Cowan et al. |
| 5,227,100 A | 7/1993 | Koslowski et al. |
| 5,302,308 A | 4/1994 | Roe |
| 5,342,566 A | 8/1994 | Schafer et al. |
| 5,366,550 A | 11/1994 | Schad |
| 5,385,607 A | 1/1995 | Kiesewetter et al. |
| 5,395,438 A | 3/1995 | Baig et al. |
| 5,432,215 A | 7/1995 | Girg et al. |
| 5,449,533 A | 9/1995 | Morizane |
| 5,534,059 A | 7/1996 | Immordino, Jr. |
| 5,558,710 A | 9/1996 | Baig |
| 5,573,333 A | 11/1996 | Dahlman |

(56) References Cited

U.S. PATENT DOCUMENTS

| | | |
|---|---|---|
| 5,575,840 A | 11/1996 | DeWacker |
| 5,575,844 A | 11/1996 | Bradshaw |
| 5,595,595 A | 1/1997 | Glenn |
| 5,643,510 A | 7/1997 | Sucech |
| 5,660,465 A | 8/1997 | Mason |
| 5,660,900 A | 8/1997 | Anderson et al. |
| 5,683,625 A | 11/1997 | Berthiaume et al. |
| 5,683,635 A | 11/1997 | Sucech et al. |
| 5,688,845 A | 11/1997 | Eden et al. |
| 5,704,179 A | 1/1998 | Lehnert |
| 5,714,032 A | 2/1998 | Ainsley et al. |
| 5,733,367 A | 3/1998 | Soeda et al. |
| 5,746,822 A | 5/1998 | Espinoza et al. |
| 5,798,010 A | 8/1998 | Richards et al. |
| 5,798,425 A | 8/1998 | Albrecht et al. |
| 5,810,956 A | 9/1998 | Tanis et al. |
| 5,817,262 A | 10/1998 | Englert |
| 5,868,824 A | 2/1999 | Andersen et al. |
| 5,871,857 A | 2/1999 | Alhamad |
| 5,876,563 A | 3/1999 | Greenwood |
| 5,879,446 A | 3/1999 | Patel et al. |
| 5,879,825 A | 3/1999 | Burke et al. |
| 5,922,447 A | 7/1999 | Baig |
| 5,945,208 A | 8/1999 | Richards et al. |
| 5,962,119 A | 10/1999 | Chan |
| 6,010,596 A | 1/2000 | Song |
| 6,030,673 A | 2/2000 | Andersen et al. |
| 6,051,700 A | 4/2000 | Wang |
| 6,054,088 A | 4/2000 | Alhamad |
| 6,059,444 A | 5/2000 | Johnson et al. |
| 6,110,271 A | 8/2000 | Skaggs et al. |
| 6,110,575 A | 8/2000 | Haga |
| 6,162,288 A | 12/2000 | Kindt et al. |
| 6,162,839 A | 12/2000 | Klauck et al. |
| 6,171,388 B1 | 1/2001 | Jobbins |
| 6,171,655 B1 | 1/2001 | Shintome |
| 6,221,521 B1 | 4/2001 | Lynn et al. |
| 6,227,186 B1 | 5/2001 | Seidl et al. |
| 6,231,970 B1 | 5/2001 | Anderson et al. |
| 6,241,815 B1 | 6/2001 | Bonen |
| 6,290,769 B1 | 9/2001 | Carkner |
| 6,299,970 B1 | 10/2001 | Richards et al. |
| 6,309,740 B1 | 10/2001 | Shu et al. |
| 6,319,312 B1 | 11/2001 | Luongo |
| 6,334,280 B1 | 1/2002 | Frappart et al. |
| 6,340,388 B1 | 1/2002 | Luongo |
| 6,340,389 B1 | 1/2002 | Klus |
| 6,342,284 B1 | 1/2002 | Yu et al. |
| 6,387,171 B1 | 5/2002 | Taylor et al. |
| 6,387,172 B1 | 5/2002 | Yu et al. |
| 6,391,958 B1 | 5/2002 | Luongo |
| 6,398,864 B1 | 6/2002 | Przybysz et al. |
| 6,406,535 B1 | 6/2002 | Shintome |
| 6,406,537 B1 | 6/2002 | Immordino |
| 6,409,819 B1 | 6/2002 | Ko |
| 6,409,824 B1 | 6/2002 | Veeramasuneni et al. |
| 6,409,825 B1 | 6/2002 | Yu et al. |
| 6,443,258 B1 | 9/2002 | Putt et al. |
| 6,475,313 B1 | 11/2002 | Peterson et al. |
| 6,481,171 B2 | 11/2002 | Yu et al. |
| 6,485,821 B1 | 11/2002 | Bruce et al. |
| 6,524,679 B2 | 2/2003 | Hauber et al. |
| 6,533,854 B2 | 3/2003 | Kesselring et al. |
| 6,572,698 B1 | 6/2003 | Ko |
| 6,613,424 B1 | 9/2003 | Putt et al. |
| 6,632,550 B1 | 10/2003 | Yu et al. |
| 6,673,144 B2 | 1/2004 | Immordino, Jr. et al. |
| 6,680,127 B2 | 1/2004 | Capps |
| 6,699,364 B2 | 3/2004 | Song et al. |
| 6,706,112 B2 | 3/2004 | Sironi et al. |
| 6,706,128 B2 | 3/2004 | Sethuraman |
| 6,711,872 B2 | 3/2004 | Anderson |
| 6,743,830 B2 | 6/2004 | Soane et al. |
| 6,746,781 B2 | 6/2004 | Francis et al. |
| 6,752,895 B1 | 6/2004 | Song et al. |
| 6,773,639 B2 | 8/2004 | Moyes et al. |
| 6,774,146 B2 | 8/2004 | Savoly et al. |
| 6,777,517 B1 | 8/2004 | Albrecht et al. |
| 6,780,356 B1 | 8/2004 | Putt et al. |
| 6,780,903 B2 | 8/2004 | Peltonen et al. |
| 6,783,587 B2 | 8/2004 | Sethuraman et al. |
| 6,800,131 B2 | 10/2004 | Yu et al. |
| 6,805,741 B1 | 10/2004 | Liu et al. |
| 6,814,799 B2 | 11/2004 | Sasage et al. |
| 6,815,049 B2 | 11/2004 | Veeramasuneni et al. |
| 6,822,033 B2 | 11/2004 | Yu et al. |
| 6,832,652 B1 | 12/2004 | Dillenbeck et al. |
| 6,841,232 B2 | 1/2005 | Tagge et al. |
| 6,846,357 B2 | 1/2005 | Reddy et al. |
| 6,874,930 B2 | 4/2005 | Wittbold et al. |
| 6,878,321 B2 | 4/2005 | Hauber et al. |
| 6,893,752 B2 | 5/2005 | Veeramasuneni et al. |
| 6,902,797 B2 | 6/2005 | Pollock et al. |
| 6,929,875 B2 | 8/2005 | Savoly et al. |
| 6,964,704 B2 | 11/2005 | Cox et al. |
| 6,983,821 B2 | 1/2006 | Putt et al. |
| 6,986,656 B2 | 1/2006 | Moyes et al. |
| 7,048,794 B2 | 5/2006 | Tagge et al. |
| 7,056,582 B2 | 6/2006 | Carbo et al. |
| 7,090,883 B2 | 8/2006 | Phipps |
| 7,101,426 B2 | 9/2006 | Tagge et al. |
| 7,105,587 B2 | 9/2006 | Tagge et al. |
| 7,172,403 B2 | 2/2007 | Burke |
| 7,217,754 B2 | 5/2007 | Koloski et al. |
| 7,244,304 B2 | 7/2007 | Yu et al. |
| 7,285,586 B2 | 10/2007 | Helbling et al. |
| 7,347,895 B2 | 3/2008 | Dubey |
| 7,364,015 B2 | 4/2008 | Englert et al. |
| 7,413,603 B2 | 8/2008 | Miller et al. |
| 7,422,638 B2 | 9/2008 | Trksak et al. |
| 7,425,236 B2 | 9/2008 | Yu et al. |
| 7,455,728 B2 | 11/2008 | Losch et al. |
| 7,470,338 B2 | 12/2008 | Callais et al. |
| 7,524,386 B2 | 4/2009 | George et al. |
| 7,544,242 B2 | 6/2009 | Liu et al. |
| 7,572,328 B2 | 8/2009 | Lettkeman et al. |
| 7,572,329 B2 | 8/2009 | Liu et al. |
| 7,588,634 B2 | 9/2009 | Lynn et al. |
| 7,608,347 B2 | 10/2009 | Lettkeman et al. |
| 7,637,996 B2 | 12/2009 | Blackburn et al. |
| 7,644,548 B2 | 1/2010 | Guevara et al. |
| 7,686,902 B2 | 3/2010 | Kimura et al. |
| 7,696,253 B2 | 4/2010 | Wantling et al. |
| 7,700,505 B2 | 4/2010 | Leclercq et al. |
| 7,708,847 B2 | 5/2010 | Sahay |
| 7,731,794 B2 | 6/2010 | Yu et al. |
| 7,736,720 B2 | 6/2010 | Yu et al. |
| 7,758,980 B2 | 7/2010 | Yu et al. |
| 7,767,019 B2 | 8/2010 | Liu et al. |
| 7,771,851 B2 | 8/2010 | Song et al. |
| 7,776,170 B2 | 8/2010 | Yu et al. |
| 7,776,461 B2 | 8/2010 | Blackburn et al. |
| 7,776,462 B2 | 8/2010 | Liu et al. |
| 7,803,226 B2 | 9/2010 | Wang et al. |
| 7,811,685 B2 | 10/2010 | Wang et al. |
| 7,815,730 B2 | 10/2010 | Wang et al. |
| 7,819,993 B2 | 10/2010 | Seki et al. |
| 7,842,218 B2 | 11/2010 | Bonetto et al. |
| 7,851,057 B2 | 12/2010 | Englert et al. |
| 7,875,114 B2 | 1/2011 | Wittbold et al. |
| 7,892,472 B2 | 2/2011 | Veeramasuneni et al. |
| 7,932,193 B2 | 4/2011 | Kajander |
| 7,932,308 B2 | 4/2011 | Lettkeman et al. |
| 7,964,034 B2 | 6/2011 | Yu et al. |
| 8,070,878 B2 | 12/2011 | Dubey |
| 8,070,895 B2 | 12/2011 | Engbrecht et al. |
| 8,088,218 B2 | 1/2012 | Blackburn et al. |
| 8,142,914 B2 | 3/2012 | Yu et al. |
| 8,262,820 B2 | 9/2012 | Yu et al. |
| 8,287,962 B2 | 10/2012 | Reagan et al. |
| 8,475,762 B2 | 7/2013 | Li et al. |
| 9,221,719 B2 | 12/2015 | Stav et al. |
| 9,296,124 B2 | 3/2016 | Rago et al. |
| 9,616,591 B2 | 4/2017 | Li et al. |

(56) References Cited

U.S. PATENT DOCUMENTS

| | | |
|---|---|---|
| 9,840,066 B2 | 12/2017 | Yu et al. |
| 2001/0001218 A1 | 5/2001 | Luongo |
| 2002/0017222 A1 | 2/2002 | Luongo |
| 2002/0096278 A1 | 7/2002 | Foster et al. |
| 2002/0108532 A1 | 8/2002 | Kesselring et al. |
| 2002/0112651 A1 | 8/2002 | Yu et al. |
| 2003/0010258 A1 | 1/2003 | Fukuda et al. |
| 2003/0019176 A1 | 1/2003 | Anderson |
| 2003/0073798 A1 | 4/2003 | Kightlinger et al. |
| 2003/0084980 A1 | 5/2003 | Seufert et al. |
| 2003/0092784 A1 | 5/2003 | Tagge et al. |
| 2003/0150360 A1 | 8/2003 | Huntsman et al. |
| 2004/0005484 A1 | 1/2004 | Veeramasuneni et al. |
| 2004/0026002 A1 | 2/2004 | Weldon et al. |
| 2004/0045481 A1 | 3/2004 | Sethuraman et al. |
| 2004/0055720 A1 | 3/2004 | Torras, Sr. et al. |
| 2004/0065232 A1 | 4/2004 | Lykke |
| 2004/0092190 A1 | 5/2004 | Bruce et al. |
| 2004/0092625 A1 | 5/2004 | Pollock et al. |
| 2004/0107872 A1 | 6/2004 | Matsuyama et al. |
| 2004/0121152 A1 | 6/2004 | Toas |
| 2004/0131714 A1 | 7/2004 | Burke |
| 2004/0149170 A1 | 8/2004 | Moran |
| 2004/0152379 A1 | 8/2004 | McLarty, III et al. |
| 2004/0209071 A1 | 10/2004 | Carbo et al. |
| 2004/0231916 A1 | 11/2004 | Englert et al. |
| 2004/0241270 A1 | 12/2004 | Moyes et al. |
| 2004/0242861 A1 | 12/2004 | Kightlinger et al. |
| 2004/0244646 A1 | 12/2004 | Larsen et al. |
| 2005/0019618 A1 | 1/2005 | Yu et al. |
| 2005/0048190 A1 | 3/2005 | Tksak et al. |
| 2005/0061203 A1 | 3/2005 | Helbling et al. |
| 2005/0067082 A1 | 3/2005 | Mowry |
| 2005/0126437 A1 | 6/2005 | Tagge et al. |
| 2005/0142348 A1 | 6/2005 | Kajander et al. |
| 2005/0150427 A1 | 7/2005 | Liu et al. |
| 2005/0181693 A1 | 8/2005 | Kajander |
| 2005/0191465 A1 | 9/2005 | Mayers et al. |
| 2005/0219938 A1 | 10/2005 | Rigaudon et al. |
| 2005/0223949 A1 | 10/2005 | Bailey, Jr. et al. |
| 2005/0225003 A1 | 10/2005 | Holderbaum et al. |
| 2005/0241541 A1 | 11/2005 | Honn et al. |
| 2005/0250858 A1 | 11/2005 | Wantling et al. |
| 2005/0250888 A1 | 11/2005 | Lettkeman et al. |
| 2005/0263925 A1 | 12/2005 | Heseltine et al. |
| 2005/0281999 A1 | 12/2005 | Hofmann et al. |
| 2006/0029785 A1 | 2/2006 | Wang et al. |
| 2006/0054060 A1 | 3/2006 | Dubey |
| 2006/0090674 A1 | 5/2006 | Fukuda et al. |
| 2006/0150868 A1 | 7/2006 | Spickemann et al. |
| 2006/0162839 A1 | 7/2006 | Seki et al. |
| 2006/0278127 A1 | 12/2006 | Liu et al. |
| 2006/0278128 A1 | 12/2006 | Liu et al. |
| 2006/0278129 A1 | 12/2006 | Liu et al. |
| 2006/0278132 A1 | 12/2006 | Yu et al. |
| 2006/0278133 A1 | 12/2006 | Yu et al. |
| 2006/0280898 A1 | 12/2006 | Lettkeman et al. |
| 2006/0280899 A1 | 12/2006 | Liu et al. |
| 2007/0022913 A1 | 2/2007 | Wang et al. |
| 2007/0032393 A1 | 2/2007 | Patel et al. |
| 2007/0048490 A1 | 3/2007 | Yu et al. |
| 2007/0056478 A1 | 3/2007 | Miller et al. |
| 2007/0059513 A1 | 3/2007 | Yu et al. |
| 2007/0082170 A1 | 4/2007 | Colbert et al. |
| 2007/0102237 A1 | 5/2007 | Baig |
| 2007/0221098 A1 | 9/2007 | Wolbers et al. |
| 2007/0251628 A1 | 11/2007 | Yu |
| 2007/0255032 A1 | 11/2007 | Bichler et al. |
| 2008/0000392 A1 | 1/2008 | Blackburn et al. |
| 2008/0060316 A1 | 3/2008 | Fukuda et al. |
| 2008/0066651 A1 | 3/2008 | Park |
| 2008/0070026 A1 | 3/2008 | Yu et al. |
| 2008/0087366 A1 | 4/2008 | Yu et al. |
| 2008/0090068 A1 | 4/2008 | Yu |
| 2008/0148997 A1 | 6/2008 | Blackburn et al. |
| 2008/0190062 A1 | 8/2008 | Engbrecht et al. |
| 2008/0227891 A1 | 9/2008 | Jarvie et al. |
| 2008/0286609 A1 | 11/2008 | Surace et al. |
| 2008/0299413 A1 | 12/2008 | Song et al. |
| 2008/0308968 A1 | 12/2008 | Immordino, Jr. |
| 2009/0010093 A1 | 1/2009 | Sethuraman et al. |
| 2009/0011207 A1 | 1/2009 | Dubey |
| 2009/0012191 A1 | 1/2009 | Deans |
| 2009/0053544 A1 | 2/2009 | Sethuraman |
| 2009/0123727 A1 | 5/2009 | Martin et al. |
| 2009/0126300 A1 | 5/2009 | Fujiwara et al. |
| 2009/0130452 A1 | 5/2009 | Surace et al. |
| 2009/0151602 A1 | 6/2009 | Francis |
| 2009/0156080 A1 | 6/2009 | Finch et al. |
| 2009/0162602 A1 | 6/2009 | Cottier et al. |
| 2009/0169864 A1 | 7/2009 | Wang et al. |
| 2009/0169878 A1 | 7/2009 | Rigaudon et al. |
| 2010/0031853 A1 | 2/2010 | Visocekas et al. |
| 2010/0075166 A1 | 3/2010 | Gilley |
| 2010/0075167 A1 | 3/2010 | Gilley et al. |
| 2010/0088984 A1 | 4/2010 | Guevara et al. |
| 2010/0136269 A1 | 6/2010 | Andersen et al. |
| 2010/0139528 A1 | 6/2010 | Yu et al. |
| 2010/0143682 A1 | 6/2010 | Shake et al. |
| 2010/0221402 A1 | 9/2010 | Wang et al. |
| 2011/0009564 A1 | 1/2011 | Wang et al. |
| 2011/0054053 A1 | 3/2011 | Lee et al. |
| 2011/0132235 A1 | 6/2011 | Yu et al. |

FOREIGN PATENT DOCUMENTS

| | | |
|---|---|---|
| AU | 747208 B2 | 3/1999 |
| AU | 199891105 B2 | 4/1999 |
| AU | 2001287161 | 5/2002 |
| AU | 200133388 B2 | 10/2002 |
| AU | 2003273011 A1 | 5/2004 |
| AU | 2005213907 B2 | 8/2006 |
| AU | 2006258027 C1 | 12/2006 |
| AU | 2006258110 A | 12/2006 |
| AU | 2007302768 B | 4/2008 |
| AU | 2007322350 A1 | 5/2008 |
| AU | 2007322350 B2 | 3/2012 |
| AU | 2012203495 A1 | 7/2012 |
| AU | 2012222102 C1 | 8/2012 |
| AU | 2014201626 B2 | 4/2014 |
| AU | 2012203495 B2 | 10/2014 |
| AU | 2007322350 C1 | 7/2017 |
| CA | 2060106 A1 | 8/1992 |
| CA | 2320637 A1 | 4/2001 |
| CA | 2447561 C | 11/2010 |
| CL | 710-1995 | 11/1995 |
| CL | 1895-1998 | 3/1999 |
| CL | 1957-2003 | 6/2004 |
| CL | 1435-2006 | 9/2006 |
| CL | 1436-2006 | 9/2006 |
| CL | 2217-06 | 11/2006 |
| CL | 2289-2006 | 4/2007 |
| CL | 910-2007 | 5/2007 |
| CL | 3124-07 | 3/2008 |
| CN | 1237148 A | 12/1999 |
| CN | 1238312 A | 12/1999 |
| CN | 101012119 A | 8/2007 |
| CN | 101456915 A | 6/2009 |
| CN | 103819748 A | 5/2014 |
| EP | 0216497 A2 | 4/1987 |
| EP | 409781 A2 | 1/1991 |
| EP | 955277 A1 | 11/1999 |
| EP | 1148067 A1 | 10/2001 |
| FR | 1225102 A | 6/1960 |
| FR | 2220639 A1 | 10/1974 |
| FR | 2376161 A1 | 7/1978 |
| FR | 2824552 A1 | 11/2002 |
| GB | 941399 A | 11/1963 |
| GB | 1028890 A | 5/1966 |
| GB | 1250713 A | 10/1971 |
| GB | 1381457 A | 1/1975 |
| GB | 1504929 A | 3/1978 |
| GB | 1561232 A | 2/1980 |
| GB | 2053779 A | 2/1981 |

(56) References Cited

FOREIGN PATENT DOCUMENTS

| | | |
|---|---|---|
| JP | S52-87405 A | 7/1977 |
| JP | S61-47162 A | 3/1986 |
| JP | H02-137781 A | 5/1990 |
| JP | H05-08344 A | 1/1993 |
| JP | 05-293350 A | 11/1993 |
| JP | 08-231258 A | 9/1996 |
| JP | 09-165244 A | 6/1997 |
| JP | 2001-504795 | 4/2001 |
| JP | 2002-070239 A | 3/2002 |
| JP | 2002-154864 A | 5/2002 |
| JP | 2003-020262 A | 1/2003 |
| JP | 2003-531096 A | 10/2003 |
| JP | 2010-179268 A | 8/2010 |
| JP | 2011-502094 A | 1/2011 |
| KR | 1020060123582 A | 12/2006 |
| KZ | 19098 A | 2/2008 |
| KZ | 23200 A4 | 1/2013 |
| RU | 2101252 C1 | 1/1998 |
| RU | 2112845 C1 | 6/1998 |
| RU | 2143341 C1 | 12/1999 |
| RU | 2215708 C2 | 11/2003 |
| RU | 2217570 C2 | 11/2003 |
| RU | 2388874 C2 | 5/2010 |
| SU | 885178 A | 11/1981 |
| SU | 887506 A | 12/1981 |
| UA | 27041 C1 | 2/2000 |
| UA | 52047 A | 12/2002 |
| UA | 88764 C2 | 11/2009 |
| WO | WO 1995/031415 A1 | 11/1995 |
| WO | WO 99/08978 A1 | 2/1999 |
| WO | WO 1999/008979 A1 | 2/1999 |
| WO | WO 99/38663 A1 | 8/1999 |
| WO | WO 2000/006518 | 2/2000 |
| WO | WO 01/34534 A2 | 5/2001 |
| WO | WO 01/45932 A1 | 6/2001 |
| WO | WO 01/81263 A1 | 11/2001 |
| WO | WO 2001/081264 | 11/2001 |
| WO | WO 2002/12141 A1 | 2/2002 |
| WO | WO 2002/31287 A1 | 4/2002 |
| WO | WO 03/000620 A1 | 1/2003 |
| WO | WO 2003/040055 A1 | 5/2003 |
| WO | WO 2003/053878 A1 | 7/2003 |
| WO | WO 03/082766 A1 | 10/2003 |
| WO | WO 2004/002916 A1 | 1/2004 |
| WO | WO 2004/024648 A1 | 3/2004 |
| WO | WO 2004/033581 A1 | 4/2004 |
| WO | WO 2004/039749 A1 | 5/2004 |
| WO | WO 2004/061042 A1 | 7/2004 |
| WO | WO 2004/083146 A2 | 9/2004 |
| WO | WO 2005/060628 A2 | 7/2005 |
| WO | WO 2005/080294 A1 | 9/2005 |
| WO | WO 2006/071116 A1 | 7/2006 |
| WO | WO 2006/135613 A2 | 12/2006 |
| WO | WO 2006/135707 A2 | 12/2006 |
| WO | WO 2006/138002 A2 | 12/2006 |
| WO | WO 2006/138273 A2 | 12/2006 |
| WO | WO 2007/024420 A2 | 3/2007 |
| WO | WO 2008/042060 A1 | 4/2008 |
| WO | WO 2008/063295 A2 | 5/2008 |

OTHER PUBLICATIONS

U.S. Appl. No. 08/916,058, Yu, filed Aug. 21, 1997.
"1/2 inch Sheetrock(R) UltraLight Panels wins USG 2011 Innovator of the Year" (2011) 1 page.
Allen, "Computed Tomography of the Antikythera Mechanism," Abstracts of 5th World Congress on Industrial Process Tomography, Bergen, Norway, Sep. 6, 2007, Abstract No. P04, p. 88.
Alme et al., "3D Reconstruction of 10000 Particle Trajectories in Real-time", Abstracts of 5th World Congress on Industrial Process Tomography, Bergen, Norway, Sep. 6, 2007, Abstract No. VIA05, p. 91.
Arrell et al., "Polycarboxylate Comb Copolymer Dispersants and Foaming Agents for Achieving Target Properties at Reduced Water Levels," Global Gypsum Conference Presentation (2005) 19 pages.
Australian/New Zealand Standard 2588, "Gypsum Plasterboard", (1998), 24 pages.
AZom.com, AZO Materials Particle Size—US Sieve Series and Tyler Mesh Size Equivalents, Retrieved on Jan. 21, 2011 from http://www.azom.corn/Details.asp?ArticleID=1417.
Banasiak et al., "Application of Charge Simulation Method (CSM) for ECT Imaging in Forward Problem and Sensitivity Matrix Calculation", Abstracts of 5th World Congress on Industrial Process Tomography, Bergen, Norway, Sep. 6, 2007, Abstract No. VIA02, p. 89.
BGC Plasterboard Fire & Acoustic Guide, p. 2 (Mar. 2013) available at www.bgcplaster.com (last visited Aug. 9, 2013) 2 pages.
Blaine, "Accelerating the hydration of calcium sulfate hemihydrate via high energy mixing," Materials and Structures, Jul. 1997, 30:362-365.
Boral Plasterboard Selector+, A2-1 (Feb. 2009) (excerpts) available at www.boral.com.au (last visited Aug. 9, 2013) 2 pages.
Burrows, "A Decade's Experience of Gypsum Board Weight Reduction in the U.S.", 14. Internationale Baustofftagung (Weimar, Sep. 20-23, 2000), 1.0197-1.0207.
Camp, T.F., "The Manufacture of Gypsum Board", Chapter III, Section II, the Manufacture and Technology of Gypsum Products, Dec. 22, 1950.
Card, J.: "Production of Lightweight Wallboard", Global Gypsum, Mar. 1999, p. 17.
Carrasco, "In Search of Lighter Board," Association of the Wall and Ceiling Industry (2002) available at www.awci.org/cd/pdft/0202_c.pdf (last visited Aug. 12, 2013) 2 pages.
Chicago Innovation Awards "USG Corporation Winner in: 2010" available at http://www.chicagoinnovationawards.comlwinner/usg-corporationl?y=2010 (last visited Aug. 12, 2013) 1 page.
Diloflo® GW Products Bulletin, "Polynaphthalene Sulfonate, Sodium Salt", GEO Specialty Chemicals, Horsham, PA (Nov. 1999).
Englert, et al., "Properties of Gypsum Fiberboard Made by the USG Process", Proceedings of the 4th International Inorganic-Bonded Wood & Fiber Composite Materials Conference, Sep. 25-28, 1994, Spokane, WA, A.A. Moslemi ed., 1995, 4:52-58.
"Foamers for Gypsum," Global Gypsum Conference Presentation—date provided on document (Apr. 9, 2005) 11 pages.
GEO Specialty Chemicals, Aero Technology, Jan. 14, 2002, two pages.
"Global Gypsum Magazine Names Sheetrock® Brand UltraLight Panels, 'Global Gypsum Product of the Year'" Global Gypsum Magazine Conference, Las Vegas, NV—date provided on document (Jan. 11, 2011) 2 pages.
Global Gypsum Magazine, Jan. 2012, Entire magazine, pp. 1-44.
Grace Specialty Vermiculite, "Zonolite #3 Agricultural/Horticultural Vermiculite" W.R. Grace & Co., Conn. USA (1999).
Grace Specialty Vermiculite, "VCX Vermiculite Ore Concentrate", W.R. Grace & Co., Conn. USA (2008).
Grodzka, P. et al., on the Development of Heat Storage Building Materials, Conf-820814-23, DE82 020814, Library of Congress Newspaper RM, (Aug. 1, 1982) 7 pages.
Guessasma et al., "Relating Cellular Structure of Open Solid Food Foams to their Young's Modulus: Finite Element Calculation", International Journal of Solid and Structures 45, pp. 2881-2896 (2008) 16 pages.
GypRock The Red Book (TM) Fire & Acoustic Design Guide, CSR (Nov. 2011) available at www.gyprock.com.au (last visited Aug. 9, 2013) 2 pages.
Gypsum Association Gypsum board typical mechanical and physical properties Published 2010 (5 Pages).
Gypsum Technologies Inc., Company Presentation, (date provided by Opponent in opposition: 2004) 31 pages.
Hannant, D.J. et al.; Polyolefin Fibrous Networks in Cement Matrices for Low Cost Sheeting; Phil. Trans. R. Soc. Land; 1980; pp. 591-597; A 294; Civil Engineering Department Univ. of Surrey, Guildford, Surrey GU2 5XH, U.K.

(56) References Cited

OTHER PUBLICATIONS

Hansen et al., "The Visualization Handbook", Ch. 9, Multidimensional Transfer Functions for Volume Rendering, pp. 189-209 (2005) 23 pages.
Henein, The Development of a Novel Foam Batching and Generating System, Jun. 1977, Masters Thesis, Concordia University, Montreal, Quebec, Canada.
Hyonic® PFM33 Products Bulletin, "Zero VOC Foaming Agent for Gypsum Wallboard", GEO Specialty Chemicals, Horsham, PA (Jul. 2000).
Janaszewski et al., Adaptive 30 Algorithm to Detect Bridging Ligaments during Intergranular Stress Corrosion Cracking of Stainless Steel Abstracts of 5th World Congress on Industrial Process Tomography, Bergen, Norway, Abstract No. VIA03, p. 90 (Sep. 6, 2007).
K.F.Mikhaylov—Manual for manufacturing prefabricated reinforced concrete articles, Moscow, Stroyizdat, 1982, pp. 42,44.
Karni, J.; Thin Gypsum Panels; Materiaux et Constructions; 1980; pp. 383-389; vol. 13, No. 77; BORDAS-DUNOD; Israel.
Kayser et al., "A Closer Look at Pore Geometry", Oilfield Review 18.1, pp. 4-13 (2006) 10 pages.
King et al., "An Effective SEM-Based Image Analysis System for Quantitative Mineralogy", KONA, No. 11., pp. 165-177 (1993) 13 pages.
Knauf Product Range, p. 9 (excerpts) available at www.knaufplasterboardcom.au (last visited Aug. 9, 2013) 2 pages.
Kuntze, R. "Gypsum—Connecting Science and Technology" (2008 edition), 31 total pgs, Chapter 7 "Wallboard", pp. 73-101, ASTM International Standards Worldwide, West Conshohocken, PA 19428-2959, Printed in Newburyport, MA, U.S.A. (Oct. 2009).
Leszek Moscicki, Extrusion—Cooking Techniques, Wiley-VCH, Poland (2011) 24 pages.
Li et al., "Updating Sensitivity Maps in Landweber Iteration for Electrical Capacitance Tomography" Abstracts of 5th World Congress on Industrial Process Tomography, Bergen, Norway, Abstract No. VIA04, p. 90 (Sep. 6, 2007).
Lin et al., Characterization and Analysis of Porous, brittle Solid Structures by Micro CT Abstracts of 5th World Congress on Industrial Process Tomography, Bergen, Norway, paper No. VIA07, p. 92 (Sep. 6, 2007).
Lin et al., "Characterization and Analysis of Porous, Brittle Solid Structures by X-Ray Micro CT" JOM, vol. 62, No. 12, p. 91-94, Mineral, Metals and Materials Society, (Dec. 2010) 4 pages.
Lindquist et al., "Medial Axis Analysis of Void Structure in Three-Dimensional Tomographic Images of Porous Media", Journal of Geophysical Research, vol. 101, No. B4, pp. 8297-8310 (Apr. 10, 1996) 14 pages.
Maad et al., "Comparing Analysis of Image Visualisation Accuracy of Electrical Capacitance Tomography and Gamma Tomography" Abstracts of 5th World Congress on Industrial Process Tomography, Bergen, Norway, Abstract No. VIA01, p. 89 (Sep. 6, 2007).
Miller, et al., "USG Process for Manufacturing Gypsum Fiber Composite Panels" Proceedings of the 4th International Inorganic-Bonded Wood & Fiber Composite Materials Conference, Sep. 25-28, 1994, Spokane, WA, A.A. Moslemi ed., 1995, 4:47-51.
Miller, et al., "USG Process for Manufacturing Fiber Composite Panels", International Cement Review, Nov. 1995, pp. 41-42.
Miller, et al., "Development and Scale-Up of USG's Gypsum Fiberboard Technology", Proceedings of the 6th International Inorganic-Bonded Wood & Fiber Composite Materials Conference, Sun Valley, ID, A.A. Moslemi, ed., 1998, 6:4-12.
Miller, et al., "Commercial Scale-Up Experience with USG's Gypsum Fiberboard Process", Proceedings of the 7th International Inorganic-Bonded Wood & Fiber Composite Materials Conference, Sun Valley, ID, A.A. Moslemi ed., 2000, 7:337-355.
Miller et al., "Three-dimensional Analysis of Particulates in Mineral Processing Systems by Cone Beam X-ray Microtomography", Minerals & Metallurgical Processing, vol. 21, No. 3 pp. 113-124. (Aug. 2004) 12 pages.

Neil, Gregory J., Excerpt from report, (date provided on excerpt Sep. 20, 1991) 3 pages.
Neil, Gregory J., Excerpt from report, (date provided on excerpt 1994) 10 pages.
Ockerman, Food Science Sourcebook, Second Edition, Part 1, Terms and Descriptions, pp. 477, 595, 722, New York, NY.
Olson, G,B.: "Computational Design of Hierarchically Structured Materials", Science, vol. 277, p. 1237 (1997).
Panel World, (Jul. 2001), pp. 10-13.
Peterson, Kurt, "Engineered Gypsum Panels, the Development and Application of Densified Zones at the Paper/ Core Interface of Gypsum Panels", Proceedings of Gypsum 2000, 6th International Conference on Natural and Synthetic Gypsum, Toronto, Canada, May 2000, pp. 9-1-9-16.
Potter, Michael J., "Vermiculite" US Geological Survey Minerals Yearbook-2001, 5 total pages (p. 82.1-82.3 and two pages of tables) (2001).
Ratinov, V.B. et al. Dobavki v beton (Concrete Admixtures), in Russian, ISBN 5274005667 / 9785274005661 / 5-274-00566-7, Moscow, Stroyizdat, 1989, pp. 20, 21, 105-110.
Rezk Salama et al., "High-Level User Interfaces for Transfer Function Design with Semantics", IEEE Transactions on Visualization and Computer Graphics, vol. 2, No. 5, pp. 1021-1028 (Sep./Oct. 2006) 8 pages.
Salyer, et al., "Utilization of Bagasse in New Composite Building Materials", Ind. Eng. Chem. Prod. Res. Dev. 1982; pp. 17-23; 21; Center for Basic and Applied Polymer Research, Univ. of Dayton, OH 45469.
Savoly, "Chemical Additives Used in Gypsum Wallboard," Global Gypsum Conference Presentation (2003) 46 pages.
Schinabeck et al.; 11th Global Gypsum Conference & Exhibit 2011 Proceedings; Paper 11, Influencing the core structure of gypsum wallboard through the use of additives, Oct. 17-18, (2011) 5 pages.
Ship et al., "Thermophysical Characterization of Type X Special Fire Resistant Gypsum Board", Proceedings of the Fire and Materials 2011 Conference, San Francisco, Jan. 31-Feb. 2, 2011, Interscience Communications Ltr., London, UK, p. 417-426.
Snyder et al., "The Stereological and Statistical Properties of Entrained Air Voids in Concrete: A Mathematical Basis for Air Void System Characterization", Materials Science of Concrete VI, Sidney Mindess and Jan Skalny, eds., The American Ceramic Society, pp. 129-214 (2001) 87 pages.
"Standard Test Methods for Physical Testing of Gypsum Panel Products", Annual Book of ASTM Standards, Designations: C 473-97, vol. 04.01 1998, pp. 253 264.
"Standard Test Methods for Physical Testing of Gypsum Panel Products", ASTM International, Designation C473-99, (Jun. 1999) 11 pages.
"Standard Test Methods for Physical Testing of Gypsum Panel Products", ASTM International, Designation C473-12, (Oct. 2012) 16 pages.
Ullmann's Encyclopedia of Industrial Chemistry, 5th Edition, vol. A4, "Calcium Sulfate" Wirsching, Franz, Dec. 20, 1985, pp. 1, 15.
Ullman's Encyclopedia of Industrial Chemistry, 5th Edition, vol. A4, "Calcium Sulfate", Wirsching, Franz, pp. 1, 15, (2005) 33 pages.
United States Gypsum Company, "Sheetrock Brand Ultralight Panels", Video—Video maintained in artifact SCORE files for U.S. Appl. No. 11/592,481, video dated 2010, video submitted on Oct. 21, 2011.
Van Wazer, Phosphorus and Its Compounds, vol. 1, Interscience Publishers, Inc., New York (1958), pp. 419-427 and pp. 6799-6795.
Videla, et al., "Watershed Functions Applied to a 3D Segmentation Problem for the Analysis of Packed Particle Beds", Part. Part. Syst. Charact. 23 (2006) 237-245, . DOI:10.1002/ppsc.200601055, Weinheim.
Virginia Vermiculite LLC, "Grade No. 4 Vermiculite Concentrate", VA, USA (Jan. 2008).
Virginia Vermiculite LLC, "Grade No. 45 Vermiculite Concentrate", VA, USA (Jan. 2008).
Weber, Charles, G., "Fiber Building Boards Their Manufacture and Use", Industrial and Engineering Chemistry; Aug. 1935; 27 (8): 896-898; National Bureau of Standards, Washington, DC.

(56) References Cited

OTHER PUBLICATIONS

Xiong et al., "Wavelet Enhanced Visualisation and Solids Distribution in the Top of Circulating Fluidized Beds" Abstracts of 5th World Congress on Industrial Process Tomography, Bergen, Norway, Abstract No. VIA06, p. 91 (Sep. 6, 2007).
Notice of Opposition filed by Hodgkinson McInnes Patents on Jun. 15, 2012 with IP Australia for Australian Patent Application No. 2007-322350 (1 Page).
"Statement of Grounds and Particulars in Support of Opposition" and Appendix A Limited filed by Hodgkinson McInnes Patents in the matter of Patent Application No. 2007322350 in the name of United States Gypsum Company and Opposition thereto by CSR Building Products on Sep. 20, 2012 (18 pages).
Request for Further and Better Particulars filed by James & Wells Intellectual Property on Nov. 15, 2012 with IP Australia for Australian Patent Application No. 2007-322350 (2 Pages).
Notice of Change in United States Gypsum Company's Agent to James & Wells filed by James & Wells Intellectual Property on Nov. 16, 2012 with IP Australia for Australian Patent Application No. 2007-322350 (2 Pages).
Opponent's Counsel's Response to IP Australia Regarding Request for Further and Better Particulars filed by Hodgkinson McInnes Patents on Nov. 16, 2012 with IP Australia for Australian Patent Application No. 2007-322350 (2 Pages).
IP Australia Requests Opponent Provide Further and Better Particulars issued by IP Australia on Nov. 23, 2012 to James & Wells Intellectual Property for Australian Patent Application No. 2007-322350 (3 Pages).
Gordon, Glen Howard, "Statutory Declaration of Glen Howard Gordon" with Exhibits GHG-1—GHG21 filed by Hodgkinson McInnes Patents in the Matter of Patent Application No. 2007-322350; By United States Gypsum Company and in the Matter of an Opposition Thereto by CSR Building Products Limited filed Dec. 13, 2012 (735 pages).
"Statement of Grounds and Particulars in Support of Opposition" (Amended on Jan. 6, 2013) in the Matter of Patent Application No. 2007322350 in the name of United States Gypsum Company and Opposition thereto by CSR Building Products Limited filed by Hodgkinson McInnes Patents filed on Jan. 8, 2013 (22 Pages).
Request for a 1 Month Extension of Time in which to Complete the Service of Our Evidence in Support filed by Hodgkinson McInnes Patents on Mar. 14, 2013 with IP Australia for Australian Patent Application Number 2007-322350 (2 Pages).
Request for a Further 1 Month Extension of Time in which to Complete the Service of Our Evidence in Support filed by Hodgkinson McInnes Patents on Apr. 12, 2013 with IP Australia for Australian Patent Application Number 2007-322350 (2 Pages).
IP Australia's Notification of 10 Days to File an Objection to Opposition's Request for a 1 Month Extension of Time issued by IP Australia on Apr. 17, 2013 to James & Wells Intellectual Property for Australian Patent Application No. 2007-322350 (1 Page).
Bruce, Bob, Declaration and Exhibits of Bob Bruce in the Matter of Patent Application No. 2007322350; by United States Gypsum Company and in the Matter of an Opposition thereto by CSR Building Products Limited filed by Hodgkinson McInnes Patents on Apr. 19, 2013 with IP Australia for Australian Patent Application Number 2007-322350 (12 Pages).
Notification of Correct Reference and Patent Application Number for the Submitted Evidence filed by James & Wells Intellectual Property on Apr. 30, 2013 with IP Australia for Australian Patent Application Number 2007-322350 (1 Page).
Neil, Gregory J., Statutory Declaration and Exhibits of Gregory J. Neil in the Matter of Patent Application No. 2007322350; by United States Gypsum Company and in the Matter of an Opposition thereto by CSR Building Products Limited filed by Hodgkinson McInnes Patents on May 13, 2013 with IP Australia for Australian Patent Application Number 2007-322350 (54 Pages).

Communication Notifying IP Australia of the Filing of Opponents Evidence in Support filed by Hodgkinson McInnes Patents on May 14, 2013 with IP Australia for Australian Patent Application Number 2007-322350 (1 Page).
Gordon, Glen Howard, "Statutory Declaration of Glen Howard Gordon" with Exhibit GHG-22 filed by James & Wells IP in the Matter of Patent Application No. 2007-322350; By United States Gypsum Company and in the Matter of an Opposition Thereto by CSR Building Products Limited filed May 15, 2013 (30 pages).
Bruce, Bob, "Statutory Declaration of Bob Bruce" filed by Hodgkinson McInnes Patents in the Matter of Patent Application No. 2007322350; by United States Gypsum Company and in the Matter of an Opposition thereto by CSR Building Products Limited filed on May 15, 2013 (8 Pages).
Neil, Gregory J., "Statutory Declaration of Gregory J. Neil" filed by Hodgkinson McInnes Patents in the Matter of Patent Application No. 2007322350; by United States Gypsum Company and in the Matter of an Opposition thereto by CSR Building Products Limited filed on May 15, 2013 (20 Pages).
Notification of Incorrect Firm, AJ Parks in Washington, DC, Receiving Communication from IP Australia Detailing Deadline for Applicant to File their Evidence in Answer and Request for Applicant's Evidence in Answer to be Due 3 Months from Date of Receipt by JAWS filed by James & Wells Intellectual Property on Jun. 6, 2013 with IP Australia for Australian Patent Application Number 2007-322350 (1 Page).
Applicant's Additional Comments Supporting Application for an Extension of Time to File Evidence in Support filed by James & Wells Intellectual Property on Aug. 13, 2013 with IP Australia for Australian Patent Application No. 2007-322350 (3 Pages).
Ball, Timothy Keith, Statutory Declaration and Exhibits of Timothy Keith Ball Dated Sep. 11, 2013 in the Matter of Australian Patent Application No. AU 2007-322350 B2 Low dust gypsum wallboard, in the name of United States Gypsum Company and in the Matter of an Opposition Thereto by CSR Building Products Limited filed by James & Wells Intellectual Property on Sep. 13, 2013 with IP Australia for Australian Patent Application Number 2007-322350 (29 Pages).
Liu, Qingxia, "Statutory Declaration of Qingxia Liu" with Exhibits QL-1-QL-13 filed by James & Wells IP in the Matter of Australian Patent Application No. AU 2007-322350 in the name of United States Gypsum Company and in the Matter of an Opposition Thereto by CSR Building Products Limited filed Sep. 13, 2013 (221 pages).
White, William O., Statutory Declaration and Exhibits of William O. White in the Matter of Patent Application No. 2007-322350; By United States Gypsum Company and in the Matter of an Opposition Thereto by CSR Building Products Limited filed by James & Wells Intellectual Property on Sep. 13, 2013 with IP Australia for Australian Patent Application No. 2007-322350 (51 Pages).
Liu, Qingxia, Supplementary Declaration of Qingxia Liu in the Matter of Patent Application No. 2007-322350; By United States Gypsum Company and in the Matter of an Opposition Thereto by CSR Building Products Limited filed by James & Wells Intellectual Property on Oct. 11, 2013 with IP Australia for Australian Patent Application No. 2007-322350 (2 Pages).
IP Australia's Confirmation of Receipt of Supplementary Declaration of Dr. Qingxia Liu on Oct. 11, 2013 issued by IP Australia on Oct. 16, 2013 to James & Wells Intellectual Property for Australian Patent Application No. 2007-322350 (1 Page).
IP Australia's Confirmation of Receipt of Opponents Notice of Intention to File Evidence in Reply on Oct. 14, 2013 issued by IP Australia on Oct. 16, 2013 to Hodgkinson McInnes Patents for Australian Patent Application No. 2007-322350 (1 Page).
Notice of Change in CSR Building Products Ltd's Agent to Griffith Hack filed by Griffith Hack on Oct. 24, 2013 with IP Australia for Australian Patent Application Number 2007-322350 (2 Pages).
Bruce, Bob, "Statutory Declaration of Bob Bruce" with Exhibits BB2-BB10 filed by Griffith Hack with IP Australia in the Matter of Patent Application No. 2007-322350; by United States Gypsum Company and in the Matter of an Opposition thereto by CSR Building Products Limited filed Dec. 12, 2013 (119 pages).

(56) References Cited

OTHER PUBLICATIONS

Neil, Gregory J., "Statutory Declaration of Gregory J. Neil" with Exhibit GJN5 filed by Griffith Hack in the Matter of Patent Application No. 2007-322350; By United States Gypsum Company and in the Matter of an Opposition Thereto by CSR Building Products Limited filed Dec. 12, 2013 (41 pages).
"Statement of Grounds and Particulars in Support of Opposition" (As further amended on Dec. 19, 2013) filed by Griffith Hack in the matter of Patent Application No. 2007-322350 in the name of United States Gypsum Company and Opposition thereto by CSR Building Products Limited filed Dec. 20, 2013 (26 pages).
"Opponent Written Submissions" filed by Griffith Hack in the matter of Patent Application No. 2007-322350; by United States Gypsum Company and in the matter of an Opposition thereto by CSR Building Products Limited filed Jan. 29, 2014 (8 pages).
"Proposed Direction Regarding Further Evidence" issued by IP Australia in the matter of Australian Patent Application No. 2007-322350 by United States Gypsum Company and in the Matter of Opposition thereto by CSR Building Products Limited filed Feb. 6, 2014 (11 pages).
Ball, Timothy Keith, "Second Statutory Declaration of Timothy Keith Ball" filed by James & Wells in the Matter of Patent Application No. 2007-322350; By United States Gypsum Company and in the Matter of an Opposition Thereto by CSR Building Products Limited filed Jun. 25, 2014 (39 pages).
Gatt, Corey Andrew, "Statutory Declaration of Corey Andrew Gatt" with Annexure A filed by James & Wells IP in the Matter of Patent Application No. 2007-322350; By United States Gypsum Company and in the Matter of an Opposition Thereto by CSR Building Products Limited filed Jun. 25, 2014 (16 pages).
Liu, Qingxia, "Declaration of Qingxia Liu" and Exhibit QL-1 filed by James & Wells IP in the Matter of Patent Application No. 2007-322350; By United States Gypsum Company and in the Matter of an Opposition Thereto by CSR Building Products Limited filed Jun. 25, 2014 (29 pages).
White, William O., "Statutory Declaration of William O. White" filed by James & Wells IP in the Matter of Patent Application No. 2007-322350; By United States Gypsum Company and in the Matter of an Opposition Thereto by CSR Building Products Limited filed Jun. 25, 2014 (39 pages).
"Statement of Proposed Amendments" filed by James & Wells IP in the matter of Australian Patent Application No. 2007-322350 by United States Gypsum Company and in the Matter of Opposition thereto by CSR Building Products Limited filed Nov. 28, 2014 (19 pages).
"Voluntary Amendments (Claims)" filed by James & Wells in the matter of Australian Patent Application No. 2007-322350 by United States Gypsum Company and in the Matter of Opposition thereto by CSR Building Products Limited filed Nov. 28, 2014 (11 pages).
"Voluntary Amendments (Drawings)" filed by James & Wells in the matter of Australian Patent Application No. 2007-322350 by United States Gypsum Company and in the Matter of Opposition thereto by CSR Building Products Limited filed Nov. 28, 2014 (5 pages).
"Opponent Comments Re S104 Voluntary Amendments" filed by Griffith Hack in the matter of Australian Patent Application No. 2007-322350 by United States Gypsum Company and in the Matter of Opposition thereto by CSR Building Products Limited filed Dec. 24, 2014 (9 pages).
"Examination Report on Voluntary Amendments" issued by IP Australia in the matter of Australian Patent Application No. 2007-322350 by United States Gypsum Company and in the Matter of Opposition thereto by CSR Building Products Limited filed Jan. 29, 2015 (2 pages).
"Applicants Comments in Response" filed by James & Wells in the matter of Australian Patent Application No. 2007-322350 by United States Gypsum Company and in the Matter of Opposition thereto by CSR Building Products Limited filed Feb. 20, 2015 (3 page).
"Statement of Grounds and Particulars in Support of Opposition" filed by Griffith Hack with IP Australia in the matter of Australian Patent App. No. 2007-322350 in the name of United States Gypsum Company and Opposition thereto by CSR Building Products Limited filed Jun. 17, 2015 (17 pages).
Bruce, Bob, "Statutory Declaration of Bob Bruce" with Exhibits BB11-BB13 filed by Griffith Hack with IP Australia in the Matter of Patent Application No. 2007-322350; by United States Gypsum Company and in the Matter of an Opposition thereto by CSR Building Products Limited filed Aug. 3, 2015 (21 pages).
Neil, Gregory J., "Statutory Declaration of Gregory J. Neil" with Exhibits GJN6-GJN9 filed by Griffith Hack in the Matter of Patent Application No. 2007-322350; By United States Gypsum Company and in the Matter of an Opposition Thereto by CSR Building Products Limited filed Aug. 3, 2015 (26 pages).
Liu, Qingxia, "Statutory Declaration of Qingxia Liu" filed by James & Wells IP in the Matter of Patent Application No. 2007322350; by United States Gypsum Company and in the Matter of an Opposition thereto by CSR Building Products Limited filed Sep. 30, 2015 (17 pages).
"Summary of Opponent Submissions" with Annexure A filed by Griffith Hack in the matter of Patent Application No. 2007-322350; by United States Gypsum Company and in the matter of an Opposition thereto by CSR Building Products Limited filed Mar. 4, 2016 (25 pages).
"Applicant's Written Submissions on Amendment to Application" filed by James & Wells IP in the Matter of Patent Application No. 2007322350; by United States Gypsum Company and in the Matter of an Opposition thereto by CSR Building Products Limited filed Mar. 10, 2016 (51 pages).
"Decision regarding amendments" issued by IP Australia in the matter of Australian Patent Application No. 2007-322350 in the name of United States Gypsum Company and Opposition by CSR dated Jul. 4, 2016 (29 pages).
Notice of Appeal filed by Kliger Partners on Aug. 3, 2016 with IP Australia for Australian Patent Application No. 2007-322350 (6 pages).
Affidavit filed by Andrew James Scott on Jan. 24, 2017 (248 pages).
Appeal Decision Reversing the Patent Office's Decision issued by Judge J. Moshinsky on May 30, 2017 (35 pages).
Order Allowing the Appeal issued by Judge J. Moshinsky on May 30, 2017 (1 page).
"Notice of Opposition" filed by Griffith Hack with IP Australia in the matter of Australian Patent App. No. 2012-203495 in the name of United States Gypsum Company and Opposition thereto by CSR Building Products Limited dated Jan. 23, 2015 (2 pages).
"Statement of Grounds and Particulars in Support of Opposition" filed by Griffith hack with IP Australia in the matter of Australian Patent App. No. 2012-203495 in the name of United States Gypsum Company and Opposition thereto by CSR Building Products Limited filed Apr. 27, 2015 (18 pages).
Bruce, Bob, "Statutory Declaration of Bob Bruce" with Exhibits BB1-BB4 filed by Griffith Hack with IP Australia in the Matter of Patent Application No. 2012-203495; by United States Gypsum Company and in the Matter of an Opposition thereto by CSR Building Products Limited filed Jul. 24, 2015 (52 pages).
Ball, Timothy, "Statutory Declaration of Timothy Keith Ball" with Exhibits KB1-KB9 filed by James & Wells IP in the Matter of Patent Application No. 2012-203495 by United States Gypsum Company and in the Matter of an Opposition thereto by CSR Building Products Limited filed Oct. 26, 2015 (862 pages).
Engbrecht, Dick Charles, "Statutory Declaration of Dick Charles Engbrecht" with Exhibits DE1-DE6 filed by James & Wells IP in the Matter of Patent Application No. 2012-203495 by United States Gypsum Company and in the Matter of an Opposition thereto by CSR Building Products Limited filed Oct. 26, 2015 (661 pages).
Chan, Eric, "Statutory Declaration of Eric Chan" with Exhibit EC1 filed by Griffith Hack in the Matter of Patent Application No. 2012-203495 by United States Gypsum Company and in the Matter of an Opposition thereto by CSR Building Products Limited filed Jan. 6, 2016 (10 pages).
Bruce, Bob, "Statutory Declaration of Bob Bruce" with Exhibit BB5 filed by Griffith Hack in the Matter of Patent Application No. 2012-203495; by United States Gypsum Company and in the Matter of an Opposition thereto by CSR Building Products Limited filed Jan. 6, 2016 (38 pages).

(56) References Cited

OTHER PUBLICATIONS

Spenner, Jonathan M., "Statement by Assignee's Representative" signed Apr. 2, 2019 (215 pages).
Song, Weixin David, "Statement by Dr. Weixin David Song" signed Sep. 7, 2016 (87 pages).
European Patent Office, Communication Pursuant to Article 94(3) EPC in European Patent Application No. 07837466.7 (dated Ju. 1, 2022).

LIGHT WEIGHT GYPSUM BOARD

This application is a continuation of U.S. patent application Ser. No. 16/518,241, filed Jul. 22, 2019; which is a continuation of U.S. patent application Ser. No. 15/802,048, filed Nov. 2, 2017 (now U.S. Pat. No. 10,406,779); which is a continuation of U.S. patent application Ser. No. 11/906,479, filed Oct. 2, 2007 (now U.S. Pat. No. 9,840,066); which is a continuation-in-part of U.S. patent application Ser. No. 11/592,481, filed Nov. 2, 2006 (now U.S. Pat. No. 9,802,866); U.S. patent application Ser. No. 11/592,481 is a continuation-in-part of U.S. patent application Ser. No. 11/449,177, filed Jun. 7, 2006 (now U.S. Pat. No. 7,731,794), and also is a continuation-in-part of U.S. patent application Ser. No. 11/445,906, filed Jun. 2, 2006 (now abandoned); each of U.S. patent application Ser. No. 11/449,177 and U.S. patent application Ser. No. 11/445,906 claim the benefit of U.S. Provisional Application No. 60/688,839, filed Jun. 9, 2005. The entire disclosures of each of the foregoing patent applications are hereby incorporated by reference.

FIELD OF THE INVENTION

The invention relates to a lightweight gypsum wallboard having a microstructure comprising large air voids having unusually thick walls with reinforced densified surfaces. It also pertains to methods of making lightweight wallboard with this microstructure.

BACKGROUND OF THE INVENTION

Certain properties of gypsum (calcium sulfate dihydrate) make it very popular for use in making industrial and building products, such as gypsum wallboard. Gypsum is a plentiful and generally inexpensive raw material which, through a process of dehydration and rehydration, can be cast, molded or otherwise formed into useful shapes. The base material from which gypsum wallboard and other gypsum products are manufactured is the hemihydrate form of calcium sulfate ($CaSO_4 \cdot \frac{1}{2}H_2O$), commonly termed "stucco," which is produced by heat conversion of the dihydrate form of calcium sulfate ($CaSO_4 \cdot 2H_2O$), from which 1½ water molecules have been removed.

Conventional gypsum-containing products such as gypsum wallboard have many advantages, such as low cost and easy workability, although substantial amounts of gypsum dust can be generated when the products are cut or drilled. Various improvements have been achieved in making gypsum-containing products using starches as ingredients in the slurries used to make such products. Pregelatinized starch, like glue, can increase flexural strength and compressive strength of gypsum-containing products including gypsum wallboard. Known gypsum wallboard contains starch at levels of less than about 10 lbs/MSF.

It is also necessary to use substantial amounts of water in gypsum slurries containing pregelatinized starch in order to ensure proper flowability of the slurry. Unfortunately, most of this water eventually must be driven off by drying, which is expensive due to the high cost of the fuels used in the drying process. This drying step is also time-consuming. It has been found that the use of naphthalenesulfonate dispersants can increase the fluidity of the slurries, thus overcoming the water demand problem. In addition, it has also been found that the naphthalenesulfonate dispersants, if the usage level is high enough, can cross-link to the pregelatinized starch to bind the gypsum crystals together after drying, thus increasing dry strength of the gypsum composite. Thus, the combination of the pregelatinized starch and the naphthalenesulfonate dispersant provide a glue-like effect in binding the set gypsum crystals together. Trimetaphosphate salts have not in the past been recognized to affect gypsum slurry water requirements. However, the present inventors have discovered that increasing the level of the trimetaphosphate salt to hitherto unknown levels in the presence of a specific dispersant makes it possible to achieve proper slurry flowability with unexpectedly reduced amounts of water, even in the presence of high starch levels. This, of course, is highly desirable because it in turn reduces fuel usage for drying as well as the process time associated with subsequent water removal process steps. Thus the present inventors have also discovered that the dry strength of gypsum board can be increased by using a naphthalenesulfonate dispersant in combination with pregelatinized starch in the slurry used to make the wallboard.

The gypsum wallboards of the instant invention should be distinguished from acoustical boards or tiles that do not have face sheets. Also, the wallboards of the instant invention should be distinguished from acoustical boards or tiles that include polystyrene as a lightweight aggregate. Importantly, the aforementioned acoustical boards and tiles do not meet many ASTM standards that apply to gypsum wallboards. For example, known acoustical boards do not have the flexural strength required of gypsum wallboards including those of the present invention. Conversely, in order for acoustical boards or tiles to meet ASTM standards, it is required that an exposed surface of the acoustical boards or tiles have hollow voids or depressions that would be undesirable in a gypsum wallboard, and would adversely effect nail pull resistance and surface hardness properties.

Dust generation is a potential problem during the installation of all wallboard. When gypsum wallboard is worked, for example, by cutting, sawing, routing, snapping, nailing or screwing down, or drilling, substantial amounts of gypsum dust can be generated. For the purposes of the instant disclosure, "dusting" and "dust generation" means the release of airborne dust into the surrounding workspace during working of a gypsum-containing product, by, for example, cutting, sawing, routing, score/snapping, nailing or screwing down, or drilling the wallboard. Working can also generally include normal board handling, including dust produced on accidentally scraping and gouging the boards during transport, carrying, and installation. If a way could be found to produce a low density wallboard in which such dust generation is significantly reduced, this would represent a particularly useful contribution to the art.

Furthermore, if a way could be found to increase the strength of gypsum wallboard while lowering board weight, this also would be a useful contribution to the art. Air voids in known wallboard products have relatively thin walls in that the wall thickness between voids is about 20 to 30 microns, on average. If a new genre of gypsum wallboards could be provided with a microstructure comprising air voids with walls of enhanced thickness and a reinforced densified surface and therefore increased wall strength, an important and useful contribution to the art would be made. Additionally, if a way could be found to increase void size while increasing the thickness and surface density of the walls between the voids to produce a low density wallboard having enhanced strength and handling properties, this would represent yet another important contribution to the art.

BRIEF SUMMARY OF THE INVENTION

The invention generally comprises a lightweight gypsum wallboard including a set gypsum core formed between two substantially parallel cover sheets, the set gypsum core having voids generally dispersed throughout the set gypsum core with walls having an average thickness of at least about 30 microns to about 200 microns and reinforced densified surfaces. The set gypsum core is made from a gypsum-containing slurry comprising water, stucco, pregelatinized starch present in an amount from about 0.5% by weight to about 10% by weight based on the weight of stucco, a naphthalenesulfonate dispersant present in an amount from about 0.2% by weight to about 2% by weight based on the weight of stucco, sodium trimetaphosphate present in an amount from about 0.1% by weight to about 0.4% by weight based on the weight of stucco, and optionally glass fiber present in an amount up to about 0.2% by weight based on the weight of stucco. Finally, soap foam will be present in an amount effective to provide a set gypsum core density from about 27 pcf to about 30 pcf. The term "pcf" is defined as pounds per cubic foot (lb/ft$^3$).

Gypsum wallboard made in accordance with the invention has high strength, yet much lower weight than conventional wallboards. In addition, it has been found that lightweight gypsum wallboard made according to embodiments of the invention have large air voids with unusually thick walls having reinforced surfaces which together strengthen the microstructure of the wallboard core, producing wallboards having outstanding strength and handling properties. In addition, we will describe methods of making such lightweight gypsum boards having outstanding strength and handling properties.

DETAILED DESCRIPTION OF THE INVENTION

Figure 1:
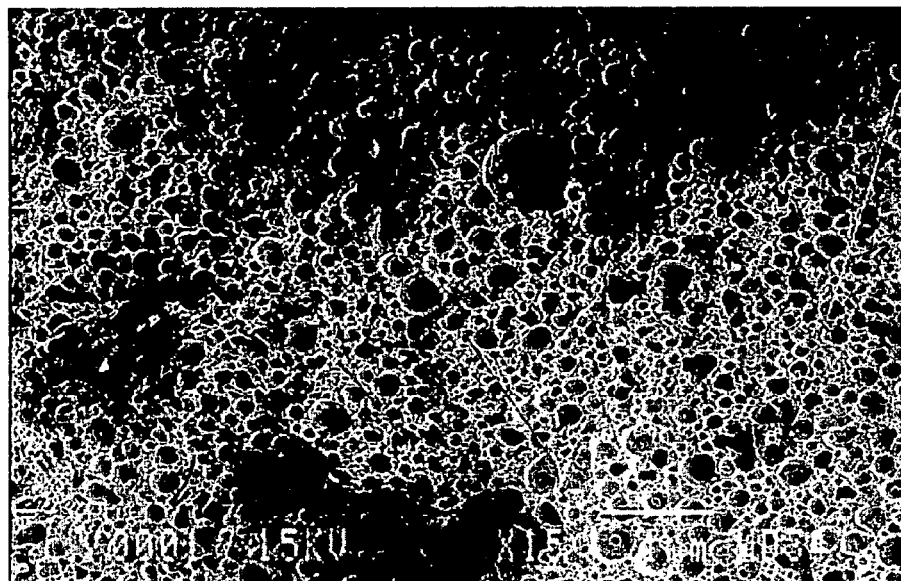
FIG. 1 is a scanning electron photomicrograph of a cast gypsum cube sample (11:08) at 15× magnification illustrating one embodiment of the present invention.

It has unexpectedly been found that gypsum wallboard made using a gypsum-containing slurry including stucco, pregelatinized starch, a naphthalenesulfonate dispersant, sodium trimetaphosphate, optionally glass fiber, and an appropriate amount of soap foam, provides increased air void volume wherein the walls surrounding (and hence also between) the air voids are substantially thicker and have reinforced surfaces and are therefore stronger than air voids found in conventional wallboards. The increased air void volume reduces the board density and weight and the thicker reinforced walls make the wallboard stronger by reinforcing the microstructure of the set gypsum core. As a result, finished lightweight wallboards made according to the invention have outstanding nail pull strength, flexural strength, core/edge hardness, and other highly desirable properties. Additionally, in one preferred embodiment, the dry weight of ½ inch finished lightweight gypsum wallboard made in accordance with the present invention can range from about 1150 lb/MSF to about 1260 lb/MSF, having low board core densities of about 27 pcf to about 30 pcf.

The introduction of the soap foam produces small air (bubble) voids, which on average can be less than about 100 microns in diameter, but are generally greater than about 10 microns in diameter, and preferably greater than about 20 microns in diameter, and more preferably greater than about 50 microns in diameter. The invention requires that these small air bubbles, along with evaporative water voids (generally about 5 microns in diameter, or less, normally less than about 2 microns in diameter), are generally evenly distributed throughout the set gypsum core in the finished wallboard products. For example, the set gypsum core can have a total void volume from about 75% to about 95%, and preferably from about 80% to about 92% wherein at least 60% of the total void volume comprises air voids having an average diameter greater than about 10 microns and at least 10% of the total void volume comprises water voids having an average diameter less than about 5 microns. It is believed that the low density board core prepared in this manner with a total void volume of the set gypsum core from about 80% to about 92% as air and water voids (total core void volume) captures a substantial amount of the small dust and other debris in the voids exposed on cutting, sawing, routing, snapping, nailing or screwing down, or drilling the boards so that dust generation is significantly reduced and does not become air-borne. More preferably, the set gypsum core of the present wallboards can have air voids in a range of about 50 microns in diameter to about 300 microns in diameter, on average.

In one embodiment, the walls of the air voids have an average thickness greater than about 30 microns, up to about 200 microns, on average. Preferably the wall thickness of the voids is at least about 50 microns, on average. More preferably, the wall thickness of the voids is from about 70 microns to about 120 microns, on average. In addition, as shown in FIGS. 15 to 19, smaller crystal size (particularly as very small, very fine needles) and denser packing of the crystals have a part in creating thicker air void walls.

The reinforcing of the surface of the walls is believed to result from migration of the pregelatinized starch/dispersant/sodium trimetaphosphate to the air void surface during the initial drying of the board to fill in needle interstices at the wall surface and hence densify the surface. This reinforces the microstructure of the set gypsum core, producing wallboard with increased strength and enhanced handling characteristics. The resulting reinforced densified surface can be seen, for example, at "A" in FIG. 15, where the indicated densified area runs along the surface of the wall. While it is believed that this reinforced surface comprises migrated pregelatinized starch, dispersant, and sodium trimetaphosphate, the inventors do not intend to be bound by this explanation and recognize that the reinforced surface may comprise less than all three of these materials and may indeed derive from a different source or mechanism.

In a preferred embodiment, the lightweight gypsum wallboard comprises a set gypsum core formed between two substantially parallel cover sheets, the set gypsum core having voids generally dispersed throughout the set gypsum core, the voids defined by thickened walls with reinforced densified surfaces. A preferred set gypsum core is made from a gypsum-containing slurry including water, stucco, pregelatinized starch present in an amount from about 0.5% by weight to about 10% by weight based on the weight of stucco, a naphthalenesulfonate dispersant present in an amount from about 0.2% by weight to about 2% by weight based on the weight of stucco, sodium trimetaphosphate present in an amount from about 0.1% by weight to about 0.4% by weight based on the weight of stucco, and optionally glass fiber present in an amount up to about 0.2% by weight based on the weight of stucco.

Figure 8:
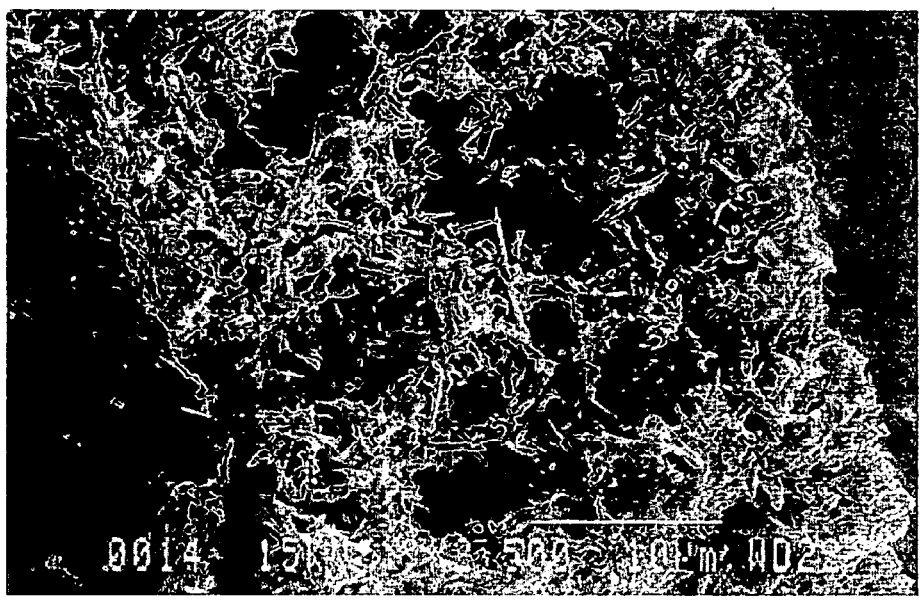
FIG. 8 is a scanning electron photomicrograph of a cast gypsum cube sample (11:50) at 2,500× magnification illustrating one embodiment of the present invention.
Figure 9:
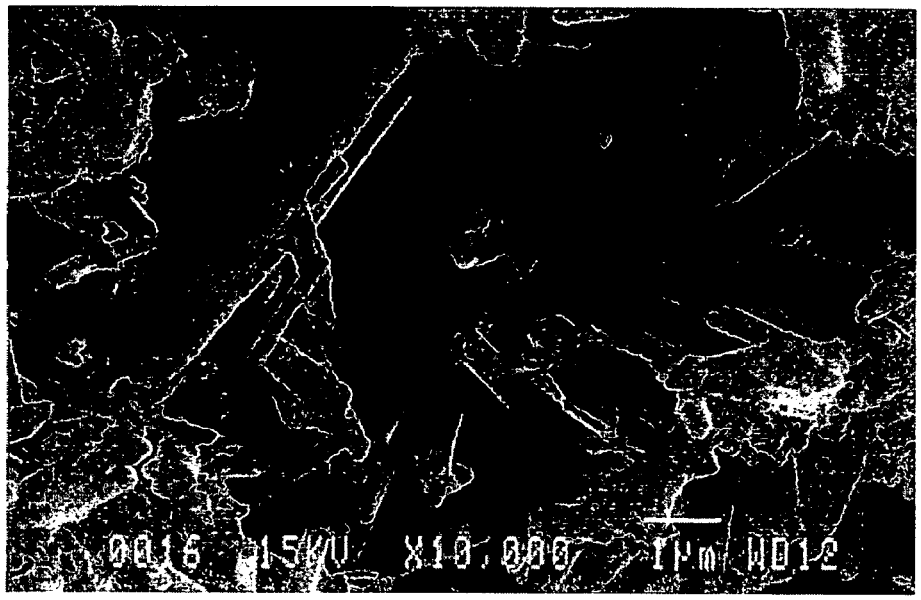
FIGS. 9-10 are scanning electron photomicrographs of a cast gypsum cube sample (11:50) at 10,000× magnification illustrating one embodiment of the present invention.
Figure 10:
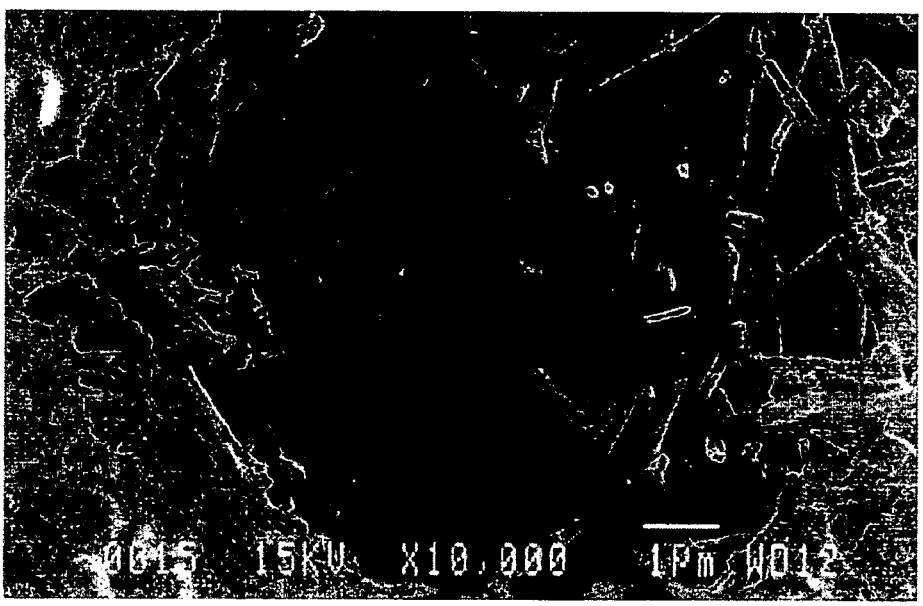
Figure 11:
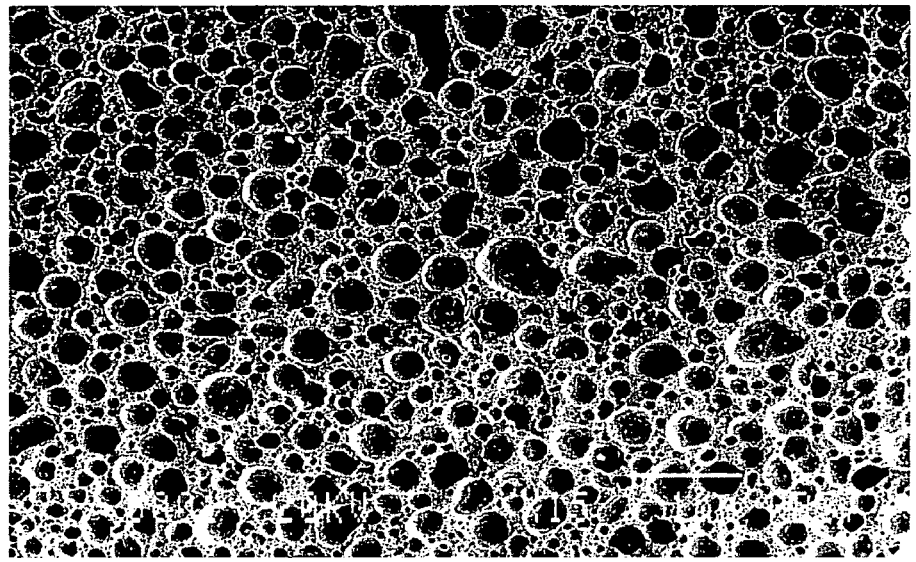
FIG. 11 is a scanning electron photomicrograph of a sample of a control board at 15× magnification illustrating air void distribution, void sizes, average wall thicknesses between the voids and the reinforced surfaces of the walls in the set gypsum core.
Figure 12:
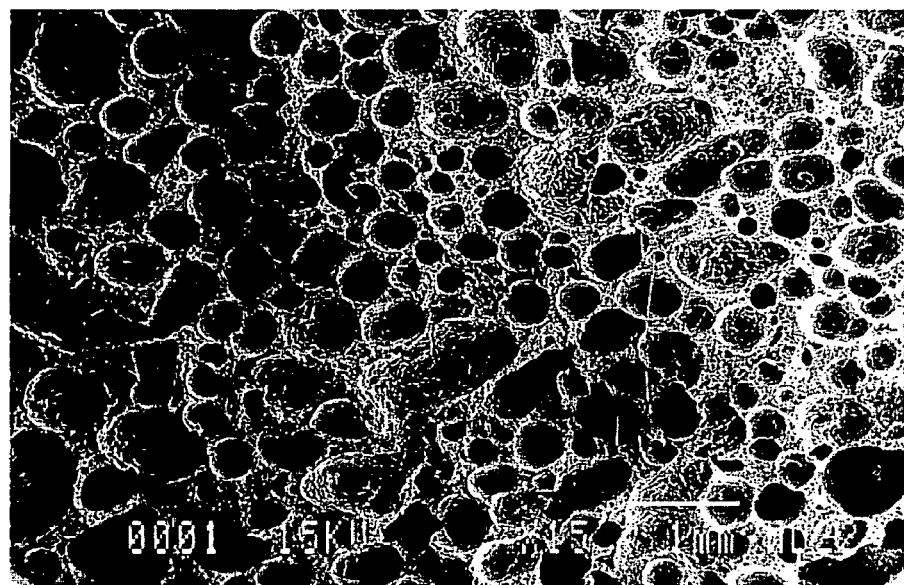
FIG. 12 is a scanning electron photomicrograph of a sample of a wallboard in accordance with the present invention at 15× magnification illustrating air void distribution, void sizes, average wall thicknesses between the voids and the reinforced surfaces of the walls in the set gypsum core according to an embodiment of the present invention.

The rehydration of calcium sulfate hemihydrate (stucco) and consequent hardening requires a specific, theoretical amount of water (1½ moles water/mole of stucco) to form calcium sulfate dihydrate crystals. However, the commercial process generally calls for excess water. This excess process water produces evaporative water voids in the gypsum crystal matrix which are generally substantially irregular in shape, and also are interconnected with other water voids, forming irregular channels in a generally continuous network between set gypsum crystals. In contrast, air (bubble) voids are introduced into the gypsum slurry using soap foam. The air voids are generally spherical/round in shape, and also are generally separated from other air voids and thus generally discontinuous. The water voids can be distributed within the walls of the air voids (see, for example, FIGS. 8-10).

The effectiveness of dust capture depends upon the composition of the set gypsum core. It has been found that the naphthalenesulfonate dispersants, if the usage level is high enough, can cross-link to the pregelatinized starch to bind the gypsum crystals together after drying, thus increasing dry strength of the gypsum composite. Further, it has now unexpectedly been found that the combination of the pregelatinized starch and the naphthalenesulfonate dispersant (organic phase) provides a glue-like effect in binding the set gypsum crystals together, and when this formulation is combined with a particular void volume and void distribution, larger sized fragments are generated on score/snapping of the finished wallboard. This result is further enhanced by the enlarged wall thickness and reinforced densified wall surface microstructure of the present invention. Larger gypsum fragments generally produce less air-borne dust. In contrast, if a conventional wallboard formulation is used, smaller fragments are generated and thus more dust. For example, conventional wallboards can generate dust fragments on saw cutting having an average diameter of about 20-30 microns, and a minimum diameter of about 1 micron. In contrast, the gypsum wallboards of the present invention generate dust fragments on saw cutting having an average diameter of about 30-50 microns, and a minimum diameter of about 2 microns; score/snapping can produce even larger fragments.

In softer wallboards, dust can be captured in both the water voids and air voids (e.g. capture of small gypsum needles as single crystal dust). Harder wallboards favor dust capture in the air voids, since larger chunks or fragments of the set gypsum core are generated on working of these boards. In this case the dust fragments are too large for the water voids, but are trapped in the air voids. It is possible, according to one embodiment of the present invention, to achieve increased dust capture by introducing a preferred void/pore size distribution within the set gypsum core. It is preferred to have a distribution of small and large void sizes, as a distribution of air and water voids. In one embodiment, a preferred air void distribution can be prepared using soap foam. See Examples 6 and 7 below.

The ratio of air voids (greater than about 10 microns) to water voids (less than about 5 microns) within the set gypsum core can range from about 1.8:1 to about 9:1. A preferred ratio of air voids (greater than about 10 microns) to water voids (less than about 5 microns) within the set gypsum core can range from about 2:1 to about 3:1. In one embodiment, the void/pore size distribution within the set gypsum core should range from about 10-30% of voids less about 5 microns and from about 70-90% of voids greater than about 10 microns, as a percentage of total voids measured. Stated in another way, the ratio of air voids (greater than 10 microns) to water voids (less than 5 microns) within the set gypsum core ranges from about 2.3:1 to about 9:1. In a preferred embodiment, the void/pore size distribution within the set gypsum core should range from about 30-35% of voids less about 5 microns and from about 65-70% of voids greater than about 10 microns, as a percentage of total voids measured. Stated in another way, the ratio of air voids (greater than 10 microns) to water voids (less than 5 microns) within the set gypsum core ranges from about 1.8:1 to about 2.3:1.

It is preferred that the average air (bubble) void size be less than about 100 microns in diameter. In a preferred embodiment, the void/pore size distribution within the set gypsum core is: greater than about 100 microns (20%), from about 50 microns to about 100 microns (30%), and less than about 50 microns (50%). That is, a preferred median void/pore size is about 50 microns.

The air voids can reduce the bonding strength between a foamed low density set gypsum core and the cover sheets. Since greater than half of the composite gypsum boards by volume may consist of air voids due to foam, the foam can interfere with the bond between the foamed low density set gypsum core and the paper cover sheets. This is addressed by optionally providing a non-foamed (or reduced-foamed) bonding high density layer on the gypsum core-contacting surfaces of either the top cover sheet or the bottom cover sheet, or both the top cover sheet and the bottom cover sheet, prior to applying the cover sheets to the core. This non-foamed, or alternatively, reduced-foamed, bonding high density layer formulation typically will be the same as that of the gypsum slurry core formulation, except that either no soap will be added, or a substantially reduced amount of soap (foam) will be added. Optionally, in order to form this bonding layer, foam can be mechanically removed from the core formulation, or a different foam-free formulation can be applied at the foamed low density set gypsum core/face paper interface.

Soap foam is preferred to introduce and to control the air (bubble) void sizes and distribution in the set gypsum core, and to control the density of the set gypsum core. A preferred range of soap is from about 0.2 lb/MSF to about 0.7 lb/MSF; a more preferred level of soap is about 0.45 lb/MSF to about 0.5 lb/MSF.

Soap foam must be added in an amount effective to produce the desired densities, and in a controlled manner. In order to control the process, an operator must monitor the head of the board forming line, and keep the envelope filled. If the envelope is not kept filled, wallboards with hollow edges result, since the slurry cannot fill the necessary volume. The envelope volume is kept filled by increasing the soap usage to prevent rupture of air bubbles during manufacturing of the board (for better retaining the air bubbles), or by increasing the air foam rate. Thus, generally, the envelope volume is controlled and adjusted either by increasing or decreasing the soap usage, or by increasing or decreasing the air foam rate. The art of controlling the head includes adjustments to the "dynamic slurry" on the table by adding soap foam to increase slurry volume, or by decreasing soap foam usage to decrease slurry volume.

According to one embodiment of the present invention, there are provided finished gypsum-containing products made from gypsum-containing slurries containing stucco, pregelatinized starch, and a naphthalenesulfonate dispersant. The naphthalenesulfonate dispersant is present in an amount of about 0.1%-3.0% by weight based on the weight of dry stucco. The pregelatinized starch is present in an amount of at least about 0.5% by weight up to about 10% by weight based on the weight of dry stucco in the formulation. Other ingredients that may be used in the slurry include binders, waterproofing agents, paper fiber, glass fiber, clay, biocide, and accelerators. The present invention requires the addition of a soap foam to the newly formulated gypsum-containing slurries to reduce the density of the finished gypsum-containing product, for example, gypsum wallboard, and to control dusting by introduction of a total void volume of from about 75% to about 95%, and preferably from about 80% to about 92%, in the form of small air (bubble) voids and water voids in the set gypsum core. Preferably, the average pore size distribution will be from about 1 micron (water voids) to about 40-50 microns (air voids).

Optionally, the combination of from about 0.5% by weight up to about 10% by weight pregelatinized starch, from about 0.1% by weight up to about 3.0% by weight naphthalenesulfonate dispersant, and a minimum of at least about 0.12% by weight up to about 0.4% by weight of trimetaphosphate salt (all based on the weight of dry stucco used in the gypsum slurry) unexpectedly and significantly increases the fluidity of the gypsum slurry. This substantially reduces the amount of water required to produce a gypsum slurry with sufficient flowability to be used in making gypsum-containing products such as gypsum wallboard. The level of trimetaphosphate salt, which is at least about twice that of standard formulations (as sodium trimetaphosphate), is believed to boost the dispersant activity of the naphthalenesulfonate dispersant.

A naphthalenesulfonate dispersant must be used in gypsum-containing slurries prepared in accordance with the present invention. The naphthalenesulfonate dispersants used in the present invention include polynaphthalenesulfonic acid and its salts (polynaphthalenesulfonates) and derivatives, which are condensation products of naphthalenesulfonic acids and formaldehyde. Particularly desirable polynaphthalenesulfonates include sodium and calcium naphthalenesulfonate. The average molecular weight of the naphthalenesulfonates can range from about 3,000 to 27,000, although it is preferred that the molecular weight be about 8,000 to 22,000, and more preferred that the molecular weight be about 12,000 to 17,000. As a commercial product, a higher molecular weight dispersant has higher viscosity, and lower solids content, than a lower molecular weight dispersant. Useful naphthalenesulfonates include DILOFLO, available from GEO Specialty Chemicals, Cleveland, Ohio; DAXAD, available from Hampshire Chemical Corp., Lexington, Mass.; and LOMAR D, available from GEO Specialty Chemicals, Lafayette, Indiana. The naphthalenesulfonates are preferably used as aqueous solutions in the range 35-55% by weight solids content, for example. It is most preferred to use the naphthalenesulfonates in the form of an aqueous solution, for example, in the range of about 40-45% by weight solids content. Alternatively, where appropriate, the naphthalenesulfonates can be used in dry solid or powder form, such as LOMAR D, for example.

The polynaphthalenesulfonates useful in the present invention have the general structure (I):

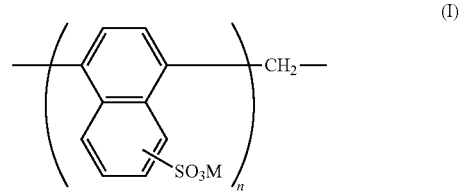

wherein n is >2, and wherein M is sodium, potassium, calcium, and the like.

The naphthalenesulfonate dispersant, preferably as an about 45% by weight solution in water, may be used in a range of from about 0.5% to about 3.0% by weight based on the weight of dry stucco used in the gypsum composite formulation. A more preferred range of naphthalenesulfonate dispersant is from about 0.5% to about 2.0% by weight based on the weight of dry stucco, and a most preferred range from about 0.7% to about 2.0% by weight based on the weight of dry stucco. In contrast, known gypsum wallboard contains this dispersant at levels of about 0.4% by weight, or less, based on the weight of dry stucco.

Stated in an another way, the naphthalenesulfonate dispersant, on a dry weight basis, may be used in a range from about 0.1% to about 1.5% by weight based of the weight of dry stucco used in the gypsum composite formulation. A more preferred range of naphthalenesulfonate dispersant, on a dry solids basis, is from about 0.25% to about 0.7% by weight based on the weight of dry stucco, and a most preferred range (on a dry solids basis) from about 0.3% to about 0.7% by weight based on the weight of dry stucco.

The gypsum-containing slurry can optionally contain a trimetaphosphate salt, for example, sodium trimetaphosphate. Any suitable water-soluble metaphosphate or polyphosphate can be used in accordance with the present invention. It is preferred that a trimetaphosphate salt be used, including double salts, that is trimetaphosphate salts having two cations. Particularly useful trimetaphosphate salts include sodium trimetaphosphate, potassium trimetaphosphate, calcium trimetaphosphate, sodium calcium trimetaphosphate, lithium trimetaphosphate, ammonium trimetaphosphate, and the like, or combinations thereof. A preferred trimetaphosphate salt is sodium trimetaphosphate. It is preferred to use the trimetaphosphate salt as an aqueous solution, for example, in the range of about 10-15% by weight solids content. Other cyclic or acyclic polyphosphates can also be used, as described in U.S. Pat. No. 6,409,825 to Yu et al., herein incorporated by reference.

Sodium trimetaphosphate is a known additive in gypsum-containing compositions, although it is generally used in a range of from about 0.05% to about 0.08% by weight based on the weight of dry stucco used in the gypsum slurry. In the embodiments of the present invention, sodium trimetaphosphate (or other water-soluble metaphosphate or polyphosphate) can be present in the range of from about 0.10% to about 0.4% by weight based on the weight of dry stucco used in the gypsum composite formulation. A preferred range of sodium trimetaphosphate (or other water-soluble metaphosphate or polyphosphate) is from about 0.12% to about 0.3% by weight based on the weight of dry stucco used in the gypsum composite formulation.

There are two forms of stucco, alpha and beta. These two types of stucco are produced by different means of calcination. In the present inventions either the beta or the alpha form of stucco may be used.

Starches, including pregelatinized starch in particular, must be used in gypsum-containing slurries prepared in accordance with the present invention. A preferred pregelatinized starch is pregelatinized corn starch, for example pregelatinized corn flour available from Bunge Milling, St. Louis, Missouri, having the following typical analysis: moisture 7.5%, protein 8.0%, oil 0.5%, crude fiber 0.5%, ash 0.3%; having a green strength of 0.48 psi; and having a loose bulk density of 35.0 lb/ft$^3$. Pregelatinized corn starch should be used in an amount of at least about 0.5% by weight up to about 10% by weight, based on the weight of dry stucco used in the gypsum-containing slurry. In a more preferred embodiment, pregelatinized starch is present in an amount from about 0.5% by weight to about 4% by weight, based on the weight of dry stucco used in the gypsum-containing slurry.

The present inventors have further discovered that an unexpected increase in dry strength (particularly in wallboard) can be obtained by using at least about 0.5% by weight up to about 10% by weight pregelatinized starch (preferably pregelatinized corn starch) in the presence of about 0.1% by weight to 3.0% by weight naphthalenesulfonate dispersant (starch and naphthalenesulfonate levels based on the weight of dry stucco present in the formulation). This unexpected result can be obtained whether or not water-soluble trimetaphosphate or polyphosphate is present.

In addition, it has unexpectedly been found that pregelatinized starch can be used at levels of at least about 10 lb/MSF, or more, in the dried gypsum wallboard made in accordance with the present invention, yet high strength and low weight can be achieved. Levels as high as 35-45 lb/MSF pregelatinized starch in the gypsum wallboard have been shown to be effective. As an example, Formulation B, as shown in Tables 1 and 2 below, includes 45 lb/MSF, yet produced a board weight of 1042 lb/MSF having excellent strength. In this example (Formulation B), a naphthalenesulfonate dispersant as a 45% by weight solution in water, was used at a level of 1.28% by weight.

A further unexpected result may be achieved with the present invention when the naphthalenesulfonate dispersant trimetaphosphate salt combination is combined with pregelatinized corn starch, and optionally, paper fiber or glass fiber. Gypsum wallboard made from formulations containing these three ingredients have increased strength and reduced weight, and are more economically desirable due to the reduced water requirements in their manufacture. Useful levels of paper fiber can range up to about 2% by weight based on the weight of dry stucco. Useful levels of glass fiber can range up to about 2% by weight based on the weight of dry stucco.

Accelerators can be used in the gypsum-containing compositions of the present invention, as described in U.S. Pat. No. 6,409,825 to Yu et al., herein incorporated by reference. One desirable heat resistant accelerator (HRA) can be made from the dry grinding of landplaster (calcium sulfate dihydrate). Small amounts of additives (normally about 5% by weight) such as sugar, dextrose, boric acid, and starch can be used to make this HRA. Sugar, or dextrose, is currently preferred. Another useful accelerator is "climate stabilized accelerator" or "climate stable accelerator," (CSA) as described in U.S. Pat. No. 3,573,947, herein incorporated by reference.

Water/stucco (w/s) ratio is an important parameter, since excess water must eventually be driven off by heating. In the embodiments of the present invention, a preferred w/s ratio is from about 0.7 to about 1.3.

Other gypsum slurry additives can include accelerators, binders, waterproofing agents, paper or glass fibers, clay, biocide, and other known constituents.

Cover sheets may be made of paper as in conventional gypsum wallboard, although other useful cover sheet materials known in the art (e.g. fibrous glass mats) may be used. Paper cover sheets provide strength characteristics in the gypsum wallboard. Useful cover sheet paper includes Manila 7-ply and News-Line 5-ply, available from United States Gypsum Corporation, Chicago, Illinois; Grey-Back 3-ply and Manila Ivory 3-ply, available from Caraustar, Newport, Indiana; Manila heavy paper and MH Manila HT (high tensile) paper, available from United States Gypsum Corporation, Chicago, Illinois. The paper cover sheets comprise top cover sheets, or face paper, and bottom cover sheets, or back paper. A preferred back cover sheet paper is 5-ply News-Line. Preferred face cover sheet papers include MH Manila HT (high tensile) paper and Manila 7-ply.

Fibrous mats may also be used as one or both of the cover sheets. One useful fibrous mat is a glass fiber mat in which filaments of glass fiber are bonded together by an adhesive. Preferably the fibrous mats will be nonwoven glass fiber mats in which filaments of glass fiber are bonded together by an adhesive. Most preferably, the nonwoven glass fiber mats will have a heavy resin coating. For example, Duraglass nonwoven glass fiber mats, available from Johns-Manville, having a weight of about 1.2-2.0 lb/100 ft², with about 40-50% of the mat weight coming from the resin coating, could be used. Other useful fibrous mats include, but are not limited to, woven glass mats and non-cellulosic fabrics.

The following examples further illustrate the invention. They should not be construed as in any way limiting the scope of the invention.

EXAMPLE 1

Sample Gypsum Slurry Formulations

Gypsum slurry formulations are shown in Table 1 below. All values in Table 1 are expressed as weight percent based on the weight of dry stucco. Values in parentheses are dry weight in pounds (lb/MSF).

TABLE 1

| Component | Formulation A | Formulation B |
| --- | --- | --- |
| Stucco (lb/MSF) | (732) | (704) |
| sodium trimetaphosphate | 0.20 (1.50) | 0.30 (2.14) |
| Dispersant (naphthalenesulfonate) | 0.18 (1.35) | 0.58 [1] (4.05) |
| Pregelatinized starch (dry powder) | 2.7 (20) | 6.4 (45) |
| Board starch | 0.41 (3.0) | 0 |
| Heat resistant accelerator (HRA) | (15) | (15) |
| Glass fiber | 0.27 (2.0) | 0.28 (2.0) |
| Paper fiber | 0 | 0.99 (7.0) |
| Soap* | 0.03 (0.192) | 0.03 (0.192) |
| Total Water (lb.) | 805 | 852 |
| Water/Stucco ratio | 1.10 | 1.21 |

*Used to pregenerate foam.
[1] 1.28% by weight as a 45% aqueous solution.

EXAMPLE 2

Preparation of Wallboards

Sample gypsum wallboards were prepared in accordance with U.S. Pat. No. 6,342,284 to Yu et al. and U.S. Pat. No. 6,632,550 to Yu et al., herein incorporated by reference. This includes the separate generation of foam and introduction of the foam into the slurry of all of the other ingredients as described in Example 5 of these patents.

Test results for gypsum wallboards made using the Formulations A and B of Example 1, and a normal control board are shown in Table 2 below. As in this example and other examples below, nail pull resistance, core hardness, and flexural strength tests were performed according to ASTM C-473. Additionally, it is noted that typical gypsum wallboard is approximately ½ A inch thick and has a weight of between about 1600 to 1800 pounds per 1,000 square feet of material, or lb/MSF. ("MSF" is a standard abbreviation in the art for a thousand square feet; it is an area measurement for boxes, corrugated media and wallboard.)

TABLE 2

| Lab test result | Control Board | Formulation A Board | Formulation B Board |
| --- | --- | --- | --- |
| Board weight (lb/MSF) | 1587 | 1066 | 1042 |
| Nail pull resistance (lb) | 81.7 | 50.2 | 72.8 |
| Core hardness (lb) | 16.3 | 5.2 | 11.6 |
| Humidified bond load (lb) | 17.3 | 20.3 | 15.1 |
| Humidified bond failure (%) | 0.6 | 5 | 11.1 |
| Flexural strength, face-up (MD) (lb) | 47 | 47.2 | 52.6 |
| Flexural strength, face-down (MD) (lb) | 51.5 | 66.7 | 78.8 |
| Flexural strength, face-up (XMD) (lb) | 150 | 135.9 | 173.1 |
| Flexural strength, face-down (XMD) (lb) | 144.4 | 125.5 | 165.4 |

MD: machine direction
XMD: across machine direction

As illustrated in Table 2, gypsum wallboards prepared using the Formulation A and B slurries have significant reductions in weight compared to the control board. With reference again to Table 1, the comparisons of the Formulation A board to the Formulation B board are most striking. The water/stucco (w/s) ratios are similar in Formulation A and Formulation B. A significantly higher level of naphthalenesulfonate dispersant is also used in Formulation B. Also, in Formulation B substantially more pregelatinized starch was used, about 6% by weight, a greater than 100% increase over Formulation A accompanied by marked strength increases. Even so, the water demand to produce the required flowability remained low in the Formulation B slurry, the difference being about 10% in comparison to Formulation A. The low water demand in both Formulations is attributed to the synergistic effect of the combination of naphthalenesulfonate dispersant and sodium trimetaphosphate in the gypsum slurry, which increases the fluidity of the gypsum slurry, even in the presence of a substantially higher level of pregelatinized starch.

As illustrated in Table 2, the wallboard prepared using the Formulation B slurry has substantially increased strength compared with the wallboard prepared using the Formulation A slurry. By incorporating increased amounts of pregelatinized starch in combination with increased amounts of naphthalenesulfonate dispersant and sodium trimetaphosphate, nail pull resistance in the Formulation B board improved by 45% over the Formulation A board. Substantial increases in flexural strength were also observed in the Formulation B board as compared to the Formulation A board.

EXAMPLE 3

½ Inch Gypsum Wallboard Weight Reduction Trials

Further gypsum wallboard examples (Boards C, D and E), including slurry formulations and test results are shown in Table 3 below. The slurry formulations of Table 3 include the major components of the slurries. Values in parentheses are expressed as weight percent based on the weight of dry stucco.

TABLE 3

|  | Control Board | Formulation C Board | Formulation D Board | Formulation E Board |
|---|---|---|---|---|
| Trial formulation component/parameter |  |  |  |  |
| Dry stucco (lb/MSF) | 1300 | 1281 | 1196 | 1070 |
| Accelerator (lb/MSF) | 9.2 | 9.2 | 9.2 | 9.2 |
| DILOFLO [1] (lb/MSF) | 4.1 (0.32%) | 8.1 (0.63%) | 8.1 (0.68%) | 8.1 (0.76%) |
| Regular starch (lb/MSF) | 5.6 (0.43%) | 0 | 0 | 0 |
| Pregelatinized corn starch (lb/MSF) | 0 | 10 (0.78%) | 10 (0.84%) | 10 (0.93%) |
| Sodium trimetaphosphate (lb/MSF) | 0.7 (0.05%) | 1.6 (0.12%) | 1.6 (0.13%) | 1.6 (0.15%) |
| Total water/stucco ratio (w/s) | 0.82 | 0.82 | 0.82 | 0.84 |
| Trial formulation test results |  |  |  |  |
| Dry board weight (lb/MSF) | 1611 | 1570 | 1451 | 1320 |
| Nail pull resistance (lb) | 77.3[†] | 85.5 | 77.2 | 65.2 |

[†]ASTM standard: 77 lb
[1] DILOFLO is a 45% Naphthalensulfonate solution in water As illustrated in Table 3, Boards C, D, and E were made from a slurry having substantially increased amounts of starch, DILOFLO dispersant, and sodium trimetaphosphate in comparison with the control board (about a two-fold increase on a percentage basis for the starch and dispersant, and a two- to three-fold increase for the trimetaphosphate), while maintaining the w/s ratio constant. Nevertheless, board weight was significantly reduced and strength as measured by nail pull resistance was not dramatically affected. Therefore, in this example of an embodiment of the invention, the new formulation (such as, for example, Board D) can provide increased starch formulated in a usable, flowable slurry, while maintaining the same w/s ratio and adequate strength.

EXAMPLE 4

Wet Gypsum Cube Strength Test

The wet cube strength tests were carried out by using Southard CKS board stucco, available from United States Gypsum Corp., Chicago, Illinois and tap water in the laboratory to determine their wet compressive strength. The following lab test procedure was used.

Stucco (1000 g), CSA (2 g), and tap water (1200 cc) at about 70° F. were used for each wet gypsum cube cast. Pregelatinized corn starch (20 g, 2.0% based on stucco wt.) and CSA (2 g, 0.2% based on stucco wt.) were thoroughly dry mixed first in a plastic bag with the stucco prior to mixing with a tap water solution containing both naphthalenesulfonate dispersant and sodium trimetaphosphate. The dispersant used was DILOFLO dispersant (1.0-2.0%, as indicated in Table 4). Varying amounts of sodium trimetaphosphate were used also as indicated in Table 4.

The dry ingredients and aqueous solution were initially combined in a laboratory Warning blender, the mixture produced allowed to soak for 10 sec, and then the mixture was mixed at low speed for 10 sec in order to make the slurry. The slurries thus formed were cast into three 2"×2"×2" cube molds. The cast cubes were then removed from the molds, weighed, and sealed inside plastic bags to prevent moisture loss before the compressive strength test was performed. The compressive strength of the wet cubes was measured using an ATS machine and recorded as an average in pounds per square inch (psi). The results obtained were as follows:

TABLE 4

| Test Sample No. | Sodium trimetaphosphate, grams (wt % based on dry stucco) | DILOFLO [1] (wt % based on dry stucco) | Wet cube weight (2" × 2" × 2"), g | Wet cube compressive strength, psi |
|---|---|---|---|---|
| 1 | 0 | 1.5 | 183.57 | 321 |
| 2 | 0.5 (0.05) | 1.5 | 183.11 | 357 |
| 3 | 1 (0.1) | 1.5 | 183.19 | 360 |
| 4 | 2 (0.2) | 1.5 | 183.51 | 361 |
| 5 | 4 (0.4) | 1.5 | 183.65 | 381 |
| 6 | 10 (1.0) | 1.5 | 183.47 | 369 |
| 7 | 0 | 1.0 | 184.02 | 345 |
| 8 | 0.5 (0.05) | 1.0 | 183.66 | 349 |
| 9 | 1 (0.1) | 1.0 | 183.93 | 356 |
| 10 | 2 (0.2) | 1.0 | 182.67 | 366 |
| 11 | 4 (0.4) | 1.0 | 183.53 | 365 |
| 12 | 10 (1.0) | 1.0 | 183.48 | 341 |
| 13 | 0 | 2.0 | 183.33 | 345 |
| 14 | 0.5 (0.05) | 2.0 | 184.06 | 356 |
| 15 | 1 (0.1) | 2.0 | 184.3 | 363 |
| 16 | 2 (0.2) | 2.0 | 184.02 | 363 |
| 17 | 4 (0.4) | 2.0 | 183.5 | 368 |
| 18 | 10 (1.0) | 2.0 | 182.68 | 339 |

[1] DILOFLO is a 45% Naphthalensulfonate solution in water

As illustrated in Table 4, Samples 4-5, 10-11, and 17, having levels of sodium trimetaphosphate in the about 0.12-0.4% range of the present invention generally provided superior wet cube compressive strength as compared to samples with sodium trimetaphosphate outside this range.

EXAMPLE 5

½ Inch Light Weight Gypsum Wallboard Plant Production Trials

Further trials were performed (Trial Boards 1 and 2), including slurry formulations and test results are shown in Table 5 below. The slurry formulations of Table 5 include the major components of the slurries. Values in parentheses are expressed as weight percent based on the weight of dry stucco.

TABLE 5

| Trial formulation component/parameter | Control Board 1 | Plant Formulation Trial Board 1 | Control Board 2 | Plant Formulation Trial Board 2 |
|---|---|---|---|---|
| Dry stucco (lb/MSF) | 1308 | 1160 | 1212 | 1120 |
| DILOFLO [1] (lb/MSF) | 5.98 (0.457%) | 7.98 (0.688%) | 7.18 (0.592%) | 8.99 (0.803%) |
| Regular starch (lb/MSF) | 5.0 (0.38%) | 0 | 4.6 (0.38%) | 0 |
| Pregelatinized corn starch (lb/MSF) | 2.0 (0.15%) | 10 (0.86%) | 2.5 (0.21%) | 9.0 (0.80%) |
| Sodium trimetaphosphate (lb/MSF) | 0.7 (0.05%) | 2.0 (0.17%) | 0.6 (0.05%) | 1.6 (0.14%) |
| Total water/stucco ratio (w/s) | 0.79 | 0.77 | 0.86 | 0.84 |
| Trial formulation test results | | | | |
| Dry board weight (lb/MSF) | 1619 | 1456 | 1553 | 1443 |
| Nail pull resistance (lb) | 81.5[†] | 82.4 | 80.7 | 80.4 |
| Flexural strength, average (MD) (lb) | 41.7 | 43.7 | 44.8 | 46.9 |
| Flexural strength, average (XMD) (lb) | 134.1 | 135.5 | 146 | 137.2 |
| Humidified bond [2] load, average (lb) | 19.2 | 17.7 | 20.9 | 19.1 |
| Humidified bond [2,3] failure (%) | 1.6 | 0.1 | 0.5 | 0 |

[†]ASTM standard: 77 lb
MD: machine direction
XMD: across machine direction
[1] DILOFLO is a 45% Naphthalensulfonate solution in water
[2] 90° F./90% Relative Humidity
[3] It is well understood that under these test conditions, percentage failure rates <50% are acceptable.

As illustrated in Table 5, Trial Boards 1 and 2 were made from a slurry having substantially increased amounts of starch, DILOFLO dispersant, and sodium trimetaphosphate, while slightly decreasing the w/s ratio, in comparison with the control boards. Nevertheless, strength as measured by nail pull resistance and flexural testing was maintained or improved, and board weight was significantly reduced. Therefore, in this example of an embodiment of the invention, the new formulation (such as, for example, Trial Boards 1 and 2) can provide increased trimetaphosphate and starch formulated in a usable, flowable slurry, while maintaining substantially the same w/s ratio and adequate strength.

EXAMPLE 6

½ Inch Ultra-Light Weight Gypsum Wallboard Plant Production Trials

Further trials were performed (Trial Boards 3 and 4) using Formulation B (Example 1) as in Example 2, except that the pregelatinized corn starch was prepared with water at 10% concentration (wet starch preparation) and a blend of HYONIC 25 AS and PFM 33 soaps (available from GEO Specialty Chemicals, Lafayette, Indiana) was used. For example, Trial Board 3 was prepared with a blend of HYONIC 25 AS and PFM 33 ranging from 65-70% by weight of 25AS, and the balance PFM 33. For example, Trial Board 4 was prepared with a 70/30 wt./wt. blend of HYONIC 25AS/HYONIC PFM 33. The trial results are shown in Table 6 below.

TABLE 6

| Lab test result | Trial Board 3 (Formulation B plus HYONIC soap blend 65/35) (n = 12) | Trial Board 4 (Formulation B plus HYONIC soap blend 70/30) (n = 34)* |
|---|---|---|
| Board weight (lb/MSF) | 1106 | 1013 |
| Nail pull resistance[a] (lb) | 85.5 | 80.3 |
| Core hardness[b] (lb) | >15 | 12.4 |
| Flexural strength, average[c] (MD) (lb) | 55.6 | 60.3 [1] |
| Flexural strength, average[d] (XMD) (lb) | 140.1 | 142.3 [1] |

*Except as marked.
[1] n = 4
MD: machine direction
XMD: across machine direction
[a]ASTM standard: 77 lb
[b]ASTM standard: 11 lb
[c]ASTM standard: 36 lb
[d]ASTM standard: 107 lb It is noted that the formulations described in this Example, which appears in parent U.S. patent application Ser. No. 11/592,481, filed Nov. 2, 2006, produces gypsum wallboard as described in the following Examples 7-9 having large air voids with unusually thick walls having reinforced densified surfaces. As illustrated in Table 6, strength characteristics as measured by nail pull and core hardness were above the ASTM standard. Flexural strength was also measured to be above the ASTM standard. Again, in this example of an embodiment of the invention, the new formulation (such as, for example, Trial Boards 3 and 4) can provide increased trimetaphosphate and starch formulated in a usable, flowable slurry, while maintaining adequate strength.

EXAMPLE 7

Percentage Void Volume Calculation in ½ Inch Thick Gypsum Wallboard Core as a Function of Board Weight and Saw Cutting Results Further trials were performed in order to determine void volumes and densities (Trial Boards No. 5 to 13) using Formulation B (Example 1) as in Example 2, except that the pregelatinized corn starch was prepared with water at 10% concentration (wet starch preparation), 0.5% glass fiber was used, and naphthalenesulfonate (DILOFLO) was used at a level of 1.2% by weight as a 45% aqueous solution. Soap foam was made using a soap foam generator and introduced into the gypsum slurry in an amount effective to provide the desired densities. In the present example, soap was used at a level from 0.25 lb/MSF to 0.45 lb/MSF. That is, the soap foam usage was increased or decreased as appropriate. In each sample, the wallboard thickness was ½ inch, and the core volume was assumed to be uniform at 39.1 ft$^3$/MSF. Void volumes were measured across 4 ft wide wallboard samples from which the front and back paper was removed. The front and back papers can have a thickness in the range 11-18 mil (each side). Void volumes/pore sizes and pore size distribution were determined by scanning electron microscopy (see Example 8 below) and X-ray CT-scanning technology (XMT).

cutting having an average diameter of about 30-50 microns, and a minimum diameter of about 2 microns; score/snapping will produce even larger fragments.

It has been shown that the combination of several key components used to make the gypsum-containing slurry, namely: stucco, naphthalenesulfonate dispersant, pregelatinized corn starch, sodium trimetaphosphate, and glass and/or paper fibers, in combination with a sufficient and effective amount of soap foam, can have a synergistic effect in producing a useful low density gypsum wallboard that also dramatically reduces gypsum dust formation during knife cutting, saw cutting, score/snapping, drilling, and normal board handling.

EXAMPLE 8

Determination of Air Bubble Void Sizes and Water Void Sizes in Trial Board No. 10, and Gypsum Crystal Morphology Cast gypsum cubes (2 inch×2 inch×2 inch) from the plant trial to prepare Trial Board No. 10 were analyzed by scanning electron microscopy (SEM). Air bubble voids and evaporative water voids were observed and measured, as well as gypsum crystal size and shape.

Figure 2:
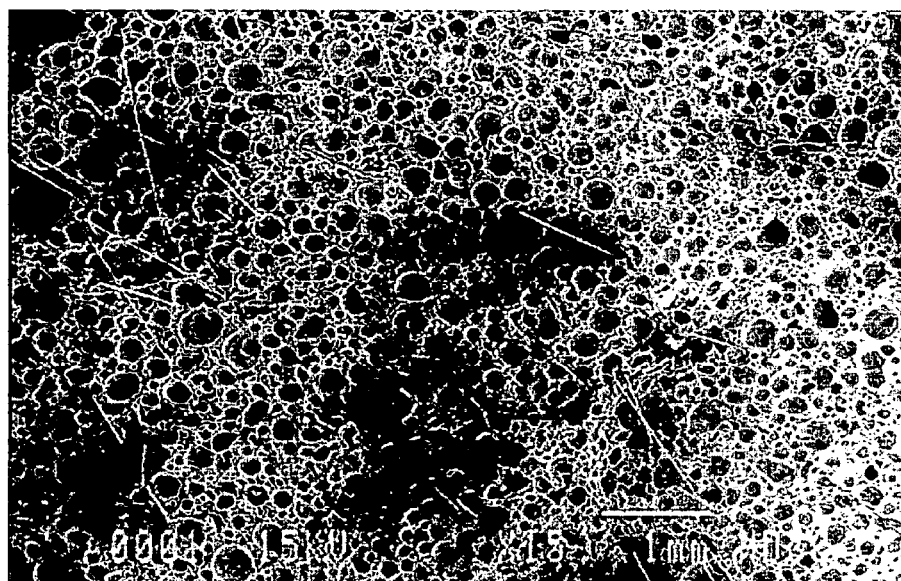
FIG. 2 is a scanning electron photomicrograph of a cast gypsum cube sample (11:30) at 15× magnification illustrating one embodiment of the present invention.
Figure 3:
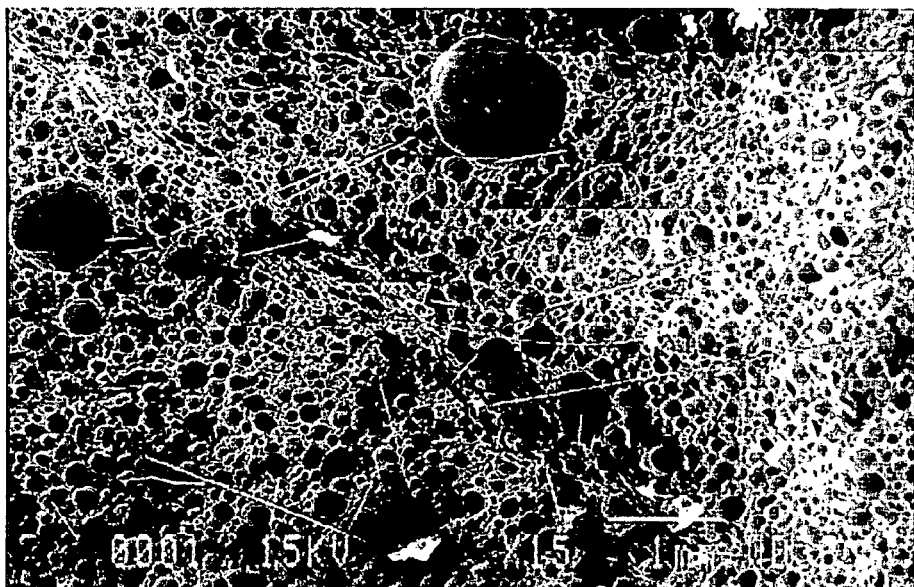
FIG. 3 is a scanning electron photomicrograph of a cast gypsum cube sample (11:50) at 15× magnification illustrating one embodiment of the present invention.
Figure 4:
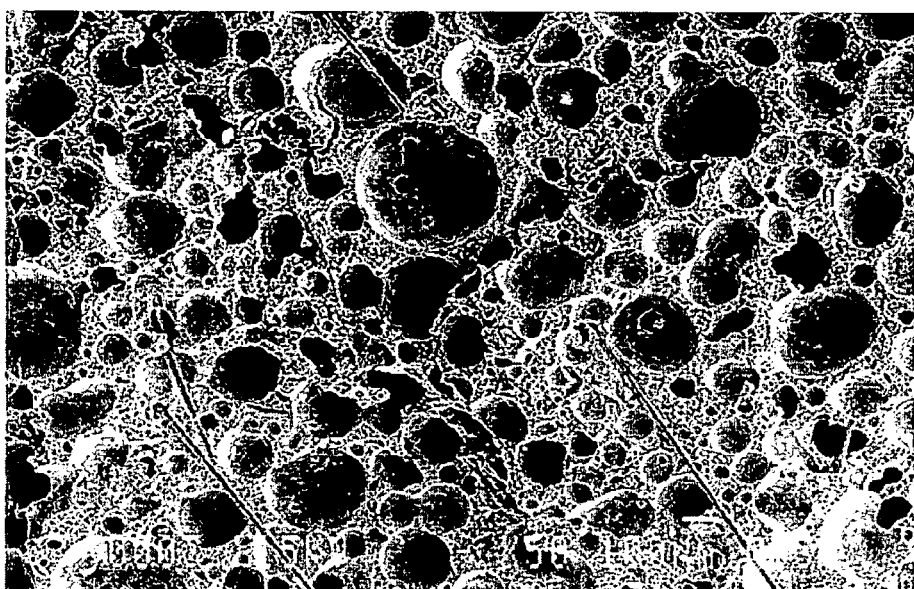
FIG. 4 is a scanning electron photomicrograph of a cast gypsum cube sample (11:08) at 50× magnification illustrating one embodiment of the present invention.
Figure 5:
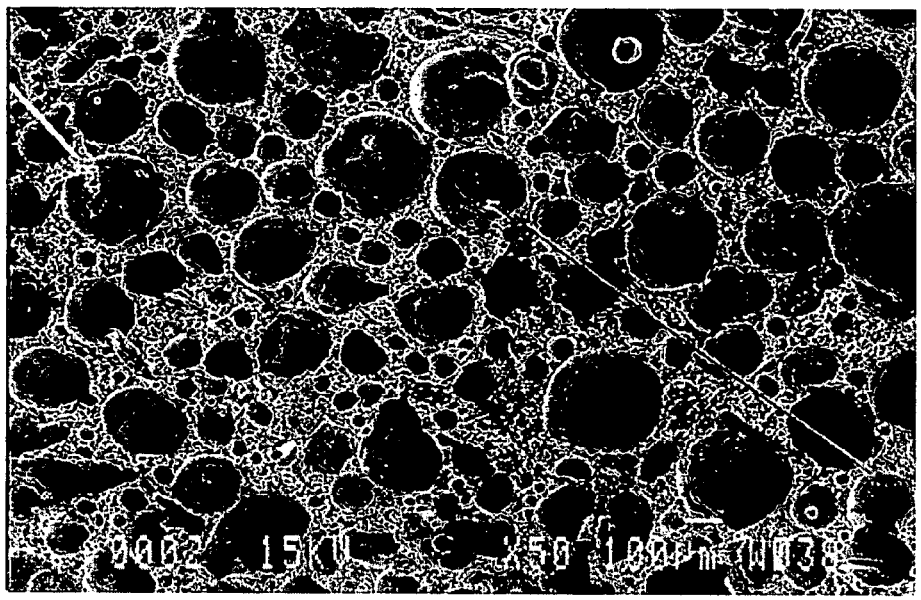
FIG. 5 is a scanning electron photomicrograph of a cast gypsum cube sample (11:30) at 50× magnification illustrating one embodiment of the present invention.
Figure 6:
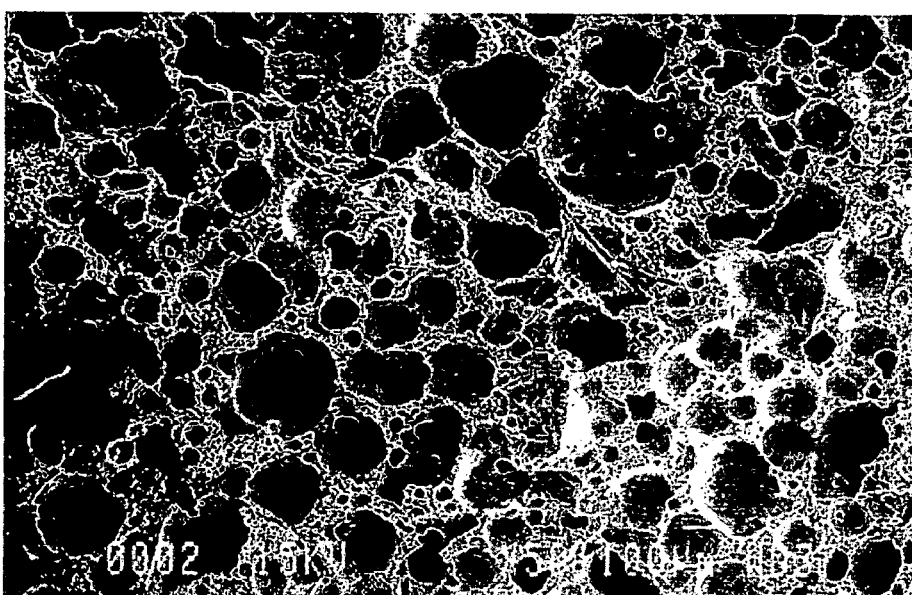
FIG. 6 is a scanning electron photomicrograph of a cast gypsum cube sample (11:50) at 50× magnification illustrating one embodiment of the present invention.
Figure 7:
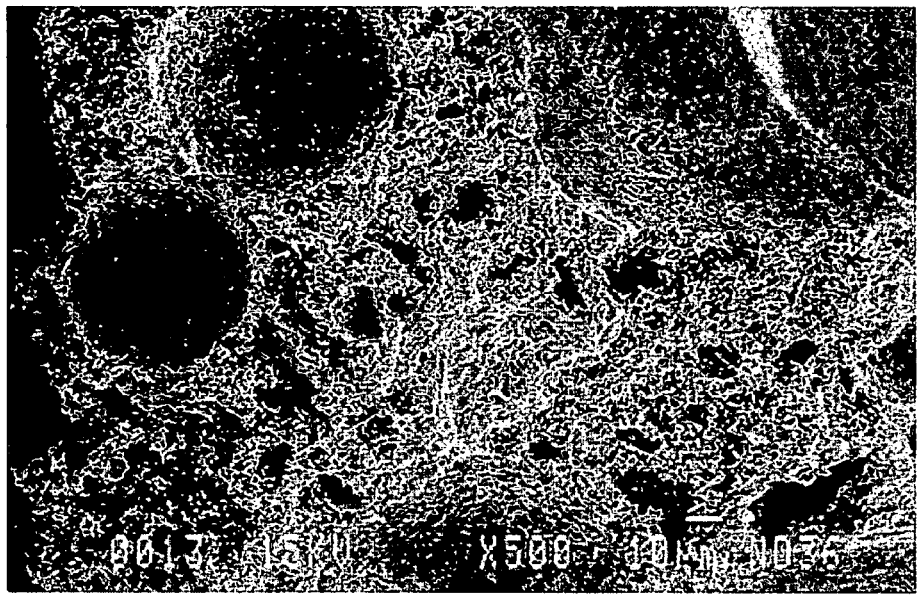
FIG. 7 is a scanning electron photomicrograph of a cast gypsum cube sample (11:50) at 500× magnification illustrating one embodiment of the present invention.

Three sample cubes were made and labeled 11:08, 11:30, and 11:50, respectively. FIGS. 1 to 3 illustrate the air bubble void sizes and distribution for each sample at 15× magnification. FIGS. 4 to 6 illustrate the air bubble void sizes and distribution for each sample at 50× magnification.

TABLE 7

| Trial Board No. | Board Weight (lb/MSF) | Foam Void Volume[1] (ft$^3$/MSF) | Foam Pore Size Distribution (%)[†] | Evaporative Void Volume[2] (ft$^3$/MSF) | Evap. Pore Size Distribution (%)[†] | Total Core Void Volume[3] (%) | Board Core Density (pcf)[4] |
|---|---|---|---|---|---|---|---|
| 5 | 1600-1700 (Control) | 15 | 54 | 12.7 | 46 | 70.8 | 39-41 |
| 6 | 1400 | 19.6 | 66 | 10.3 | 34 | 76.5 | 34 |
| 7 | 1300 | 21.1 | 69 | 9.4 | 31 | 78.0 | 31 |
| 8 | 1200 | 20.9 | 68 | 10.0 | 32 | 79.0 | 28 |
| 9 | 1100 | 21.1 | 67 | 10.4 | 33 | 80.6 | 26 |
| 10 | 1000 | 20.9 | 65 | 11.1 | 35 | 81.8 | 23 |
| 11 | 900 | 23.4 | 71 | 9.5 | 29 | 84.1 | 21 |
| 12 | 800 | 25.5 | 76 | 8.1 | 24 | 85.9 | 18 |
| 13 | 500 | 31.5 | 88 | 4.5 | 12 | 92.1 | 10 |

[1] >10 micron air (bubble) voids
[2] <5 micron water voids
[3] Based on uniform core vol. = 39.1 ft$^3$/MSF; i.e., Total core void volume = foam void vol. + evaporative void vol./39.1 × 100
[4] Based on uniform core vol. = 39.1 ft$^3$/MSF; i.e., Board core density (pcf) = Board weight (lb/MSF) − weight of paper cover sheets (lb/MSF)/39.1 ft$^3$/MSF = Board weight (lb/MSF) − 90 lb/MSF/39.1 ft$^3$/MSF
[†] Percent of total voids measured As illustrated in Table 7, trial board samples having total core void volumes ranging from 79.0% to 92.1% were made, which correspond to board core densities ranging from 28 pcf down to 10 pcf, respectively. As an example, saw cutting of Trial board 10, having a total core void volume of 81.8% and a board core density of 23 pcf, generated about 30% less dust than control board. As an additional example, if wallboards with a conventional formulation having less binder (as starch with or without dispersant) were made that had significantly less that about 75-80% total core void volume, significantly greater dust generation would be expected on cutting, sawing, routing, snapping, nailing or screwing down, or drilling. For example, conventional wallboards can generate dust fragments on saw cutting having an average diameter of about 20-30 microns, and a minimum diameter of about 1 micron. In contrast, the gypsum wallboards of the present invention will generate dust fragments on saw At higher magnifications, water voids were observed, for example in the generally substantially larger air bubble void walls, as shown in FIGS. 7 to 10 for sample cube 11:50, up to 10,000× magnification. Almost all of the gypsum crystals were needles; few platelets were observed. The density and packing of the needles varied on the surfaces of the air bubble voids. Gypsum needles were also observed in the water voids in the air bubble void walls.

The SEM results demonstrate that in the gypsum-containing products made according to the present invention, the air and water voids are generally evenly distributed throughout the set gypsum core. The observed void sizes and void distributions also demonstrate that sufficient free space is formed as air and water voids (total core void volume) such that a substantial amount of the gypsum dust produced will be captured in the surrounding voids exposed upon normal board handling and during the cutting, sawing, routing, snapping, nailing or screwing down, or drilling and does not become air-borne.

EXAMPLE 9

Dust Capture in Low Dust Gypsum Wallboard

If a wallboard were prepared according to the teachings of the present invention as in Example 7, it is expected that the gypsum dust produced on working the wallboard would comprise at least 50% by weight gypsum fragments larger than about 10 microns in diameter. At least about 30% or more of the total dust generated by working the wallboard by cutting, sawing, routing, score/snapping, nailing or screwing down, and drilling, would be captured.

EXAMPLE 10

Additional ½ Inch Light Weight Gypsum Wallboard Plant Production Trial Formulation Examples 7 to 9 provide a light weight wallboard having increased void volume. The remaining examples parallel those of Examples 7 to 9 but also highlight the increased wall thickness and reinforced densified void wall surfaces of the wallboard microstructure. It is noted, in this connection, that the photomicrographs of FIGS. 5 and 6 of Example 8 show a microstructure comprising both large air voids and walls of enhanced thickness in accordance with the present invention.

Thus further slurry formulations (Trial 14) were prepared as shown in Table 8 below. The slurry formulations of Table 8 include the major components of the slurries. Values in parentheses are expressed as weight percent based on the weight of dry stucco.

TABLE 8

| Trial formulation component/parameter | Plant Formulation Trial 14 | Control Formulation A | Control Formulation B |
|---|---|---|---|
| Dry stucco (lb/MSF) | 902 | 1145 | 1236 |
| DILOFLO [1] (lb/MSF) | 14 (1.6%) | 5.22 (0.456%) | 1.98 (0.160%) |
| Regular starch (lb/MSF) | 0 | 2.0 (0.17%) | 4.0 (0.32%) |
| Pregelatinized corn starch (lb/MSF) | 26 (2.9%) | 5.6 (0.49%) | 0 |
| Sodium trimetaphosphate (lb/MSF) | 2.78 (0.308%) | 0.74 (0.06%) | 0.61 (0.05%) |
| Glass fiber (lb/MSF) | 2.0 (0.22%) | 0.34 (0.03%) | — |
| Soap blend [2] (lb/MSF) | 0.52 (0.058%) | N/A | N/A |
| Total water/stucco ratio (w/s) | 0.87 | 0.82 | 0.78 |

[1] DILOFLO is a 45% Naphthalensulfonate solution in water
[2] 95/5 wt./wt. blend of HYONIC 25 AS and PFM 33 soaps. Note that during dynamic manufacturing process, the soap ratio can range from 70/30 upwards to a desired target range, e.g. from 70/30 to 80/20 to 85/15 or up to 90/10.

EXAMPLE 11

Additional ½ Inch Light Weight Gypsum Wallboard Plant Production Trials

Test results for gypsum wallboards made using the Plant Trial Formulation 14 and Control Formulation A of Example 10, and two conventional competitive boards, are shown in Table 9 below. After conditioning at 70° F./50% Relative Humidity for 24 hours, the wallboard samples were tested for nail pull resistance, edge/core hardness, flexural strength, and 16-hour humidified bond. Nail pull resistance, edge/core hardness, humidified deflection, and flexural strength tests were performed according to ASTM C-473. Non-combustibility was performed according to ASTM E-136. Surface burning characteristics testing was performed according to ASTM E-84 to determine Flame-Spread Index (FSI). Board samples were analyzed by scanning electron microscopy (see Example 12 below) and energy dispersive spectroscopy (EDS). Board samples can also be analyzed by X-ray CT-scanning technology (XMT).

Dust generation measurements by saw-cutting and drilling tests. To determine dust generation by drilling, 50 holes were drilled in a finished wallboard sample using a drill press and the resulting gypsum dust was collected. To determine dust generation by hand-sawing, five 1 foot length sections of finished wallboard were cut and the resulting gypsum dust was collected. To determine dust generation by hole-sawing, 5 circles of 4 inch diameter were cut into a finished wallboard sample and the resulting gypsum dust was collected.

TABLE 9

| Trial formulation test results | Plant Formulation Trial Board 14 | Control Formulation Board A | Conventional Competitive Gypsum Board 1 | Conventional Competitive Gypsum Board 2 |
| --- | --- | --- | --- | --- |
| Dry board weight (lb/MSF) | 1232 | 1439 | 1655 | 1652 |
| Nail pull resistance (lb) | 80.5 | 89.2 | 73.8 | 72.0 |
| Flexural strength, average (MD) (lb) | 44.9 | 43.8 | 39.3 | 50.4 |
| Flexural strength, average (XMD) (lb) | 146.1 | 130.1 | 126.7 | 124.4 |
| Hardness, core (lb) | 17.6 | 20.3 | 16.7 | 16.7 |
| Hardness, edge (lb) | 33.9 | 31.2 | 27.0 | 22.3 |
| Humidified deflection (in) | 0.22 | 0.22 | 4.38 | 4.10 |
| 16-hour Humidified bond [1] load, average (FU) (lb) | 14.3 | 13.5 | 10.7 | 10.0 |
| 16-hour Humidified bond [1] load, average (FD) (lb) | 15.8 | 13.7 | 14.6 | 11.2 |
| Non-combustibility | Pass | Pass | Pass | Pass |
| Flame-Spread Index | 15 | 15 | N/A | N/A |
| Dust generation, drill (g) | 1.20 | 1.35 | 1.59 | 1.53 |
| Dust generation, hole saw (g) | 19.63 | 20.93 | 21.83 | 21.87 |
| Dust generation, hand saw (g) | 11.82 | 13.42 | 14.02 | 14.54 |

[1] 90° F./90% Relative Humidity

As illustrated in Table 9, Trial Board 14 strength characteristics as measured by nail pull resistance, flexural strength, and edge/core hardness were superior to conventional competitive boards and exceeded the ASTM standard. Humidified deflection (sag) was superior to conventional competitive boards and exceeded the ASTM standard. Humidified bond: In addition to excellent paper-to-core bonding (no failure), Trial Board No. 14 had the best results for bond strength, as shown in Table 9. Finally, in addition to passing the non-combustibility test under the ASTM standard, Trial Board No. 14 was determined to be a Class-A material under the ASTM standard.

In addition, Trial Board No. 14 samples were assessed for handling, staging, and installation sequence by evaluating appearance, sheet slide, flexural test, fireman's carry, corner rotation, edge drag, edge drop, score and snap, rasping, hole-cutting, screw-setting, nail-setting, and 10 foot radius. The conclusions of the evaluation were that the handling properties of Trial Board No. 14 were equal to or exceeded Control Board A and other conventional competitive gypsum boards of Table 9.

EXAMPLE 12

Determination of Air Bubble Surface Features in Trial Board No. 14, and Gypsum Crystal Morphology As in Example 8, cast gypsum cubes (2 inch×2 inch×2 inch) from the plant trial to prepare Trial Board No. 14 were analyzed by scanning electron microscopy (SEM). Air bubble voids and evaporative water voids were observed and measured, as well as gypsum crystal size and shape.

The SEM results again demonstrate that in the gypsum-containing products made according to the present invention, the air and water voids are generally evenly distributed throughout the set gypsum core. The observed void sizes and void distributions also demonstrate that sufficient free space is formed as air and water voids (total core void volume) such that a substantial amount of the gypsum dust produced will be captured in the surrounding voids exposed upon normal board handling and during the cutting, sawing, routing, snapping, nailing or screwing down, or drilling and does not become air-borne.

Figure 13:
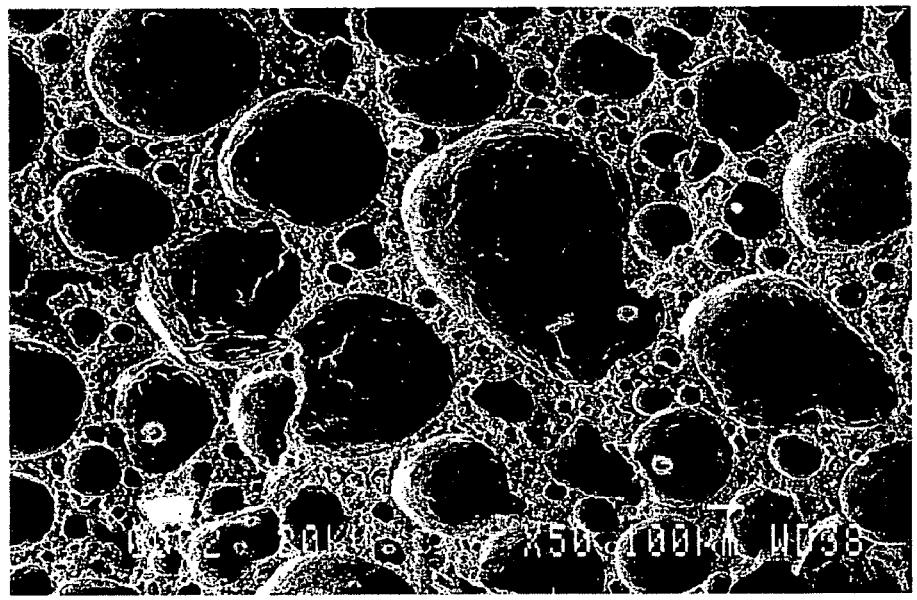
FIG. 13 is a scanning electron photomicrograph of a sample of the control board of FIG. 11 at 50× magnification illustrating air void distribution, void sizes, average wall thicknesses between the voids and the reinforced surfaces of the walls in the set gypsum core.
Figure 14:
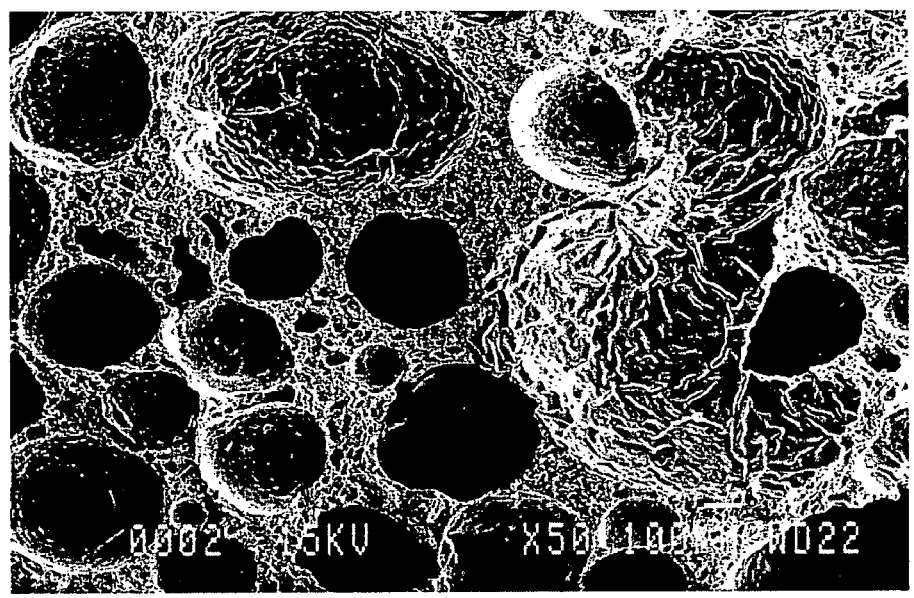
FIG. 14 is a scanning electron photomicrograph of a sample of the wallboard of FIG. 12 at 50× magnification illustrating air void distribution, void sizes, average wall thicknesses between the voids and the reinforced surfaces of the walls in the set gypsum core according to an embodiment of the present invention.
Figure 15:
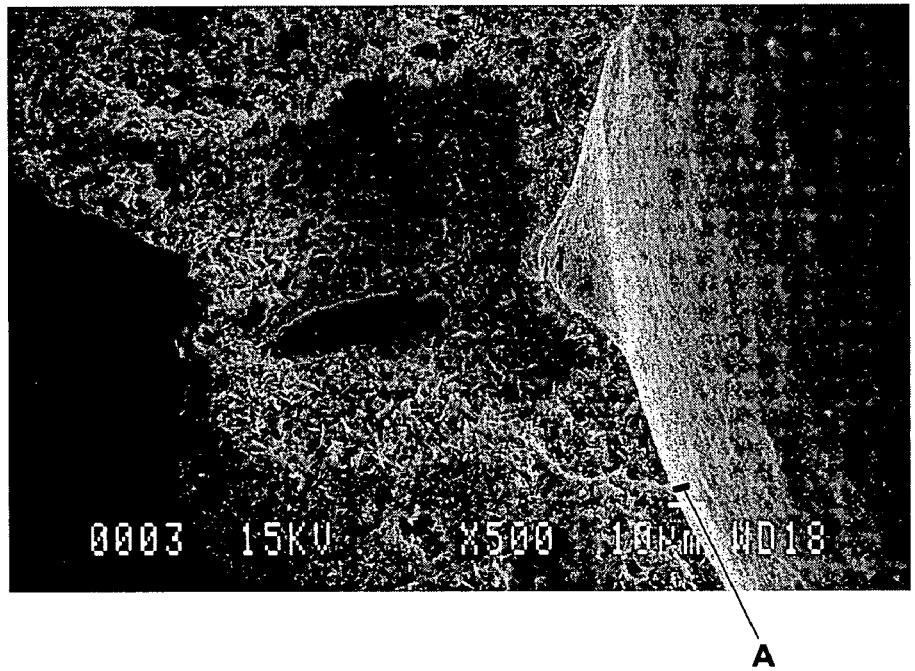
FIG. 15 is a scanning electron photomicrograph of a sample of the wallboard of FIG. 12 at 500× magnification illustrating average wall thicknesses between the voids and microstructure features in the set gypsum core according to an embodiment of the present invention.
Figure 16:
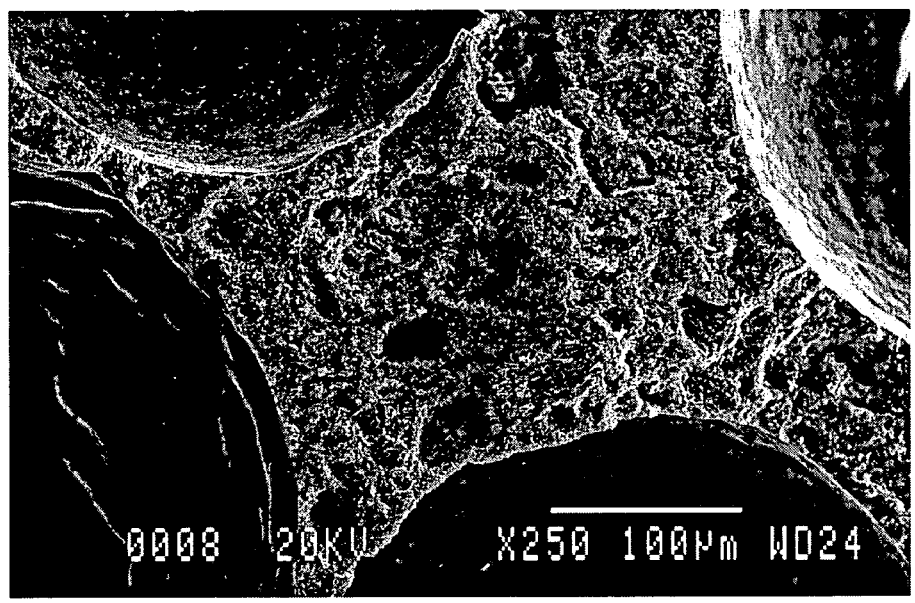
FIG. 16 is a scanning electron photomicrograph of a sample of the wallboard of FIG. 12 at 250× magnification illustrating average wall thicknesses between the voids and microstructure features in the set gypsum core according to an embodiment of the present invention.
Figure 17:
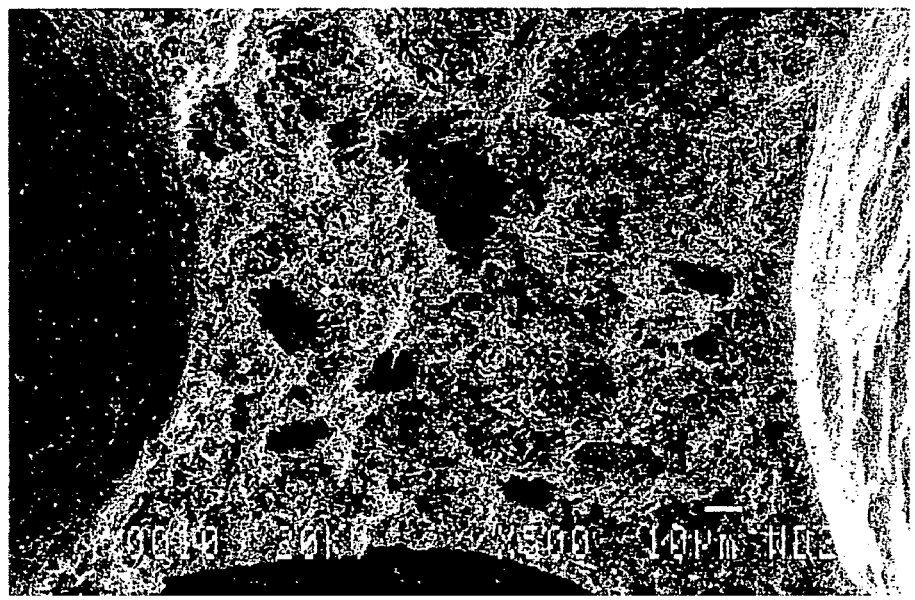
FIG. 17 is a scanning electron photomicrograph of a sample of the wallboard of FIG. 16 at 500× magnification illustrating average wall thicknesses between the voids and microstructure features in the set gypsum core according to an embodiment of the present invention.
Figure 18:
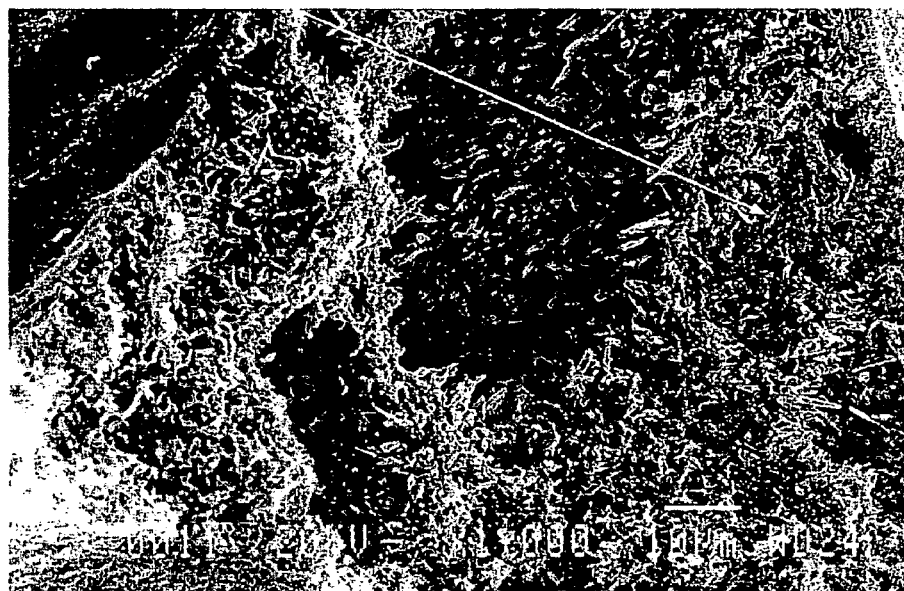
FIG. 18 is a scanning electron photomicrograph of a sample of the wallboard of FIG. 16 at 1,000× magnification illustrating average wall thicknesses between the voids and microstructure features in the set gypsum core according to an embodiment of the present invention.
Figure 19:
FIG. 19 is a scanning electron photomicrograph of a sample of the wallboard of FIG. 16 at 2,500× magnification illustrating average wall thicknesses between the voids and microstructure features in the set gypsum core according to an embodiment of the present invention.

The SEM results of FIGS. 11-19 illustrate the wall thicknesses at enhanced magnification paralleling earlier SEM photomicrographs of Example 8. These SEM results, as illustrated in FIGS. 13 and 14, comparing Trial Board No. 14 and Control Board A, respectively, demonstrate the following two improvements: 1) air bubble voids in the trial board were substantially larger than those in the control board, and 2) average wall thicknesses between the voids in the trial board were much larger than average the wall thicknesses between the voids in the control board. Generally, average wall thicknesses between the voids in Trial Board No. 14 were at least about 50 microns up to about 200 microns. In contrast, average wall thicknesses between the voids in Control Board A were generally about 20-30 microns. Additionally, the 500× photomicrograph of FIG. 15 shows reinforced densified surface "A" running along the wall of a void to the right in the photomicrograph.

As discussed above, the larger average wall thicknesses between the air voids, provide higher strength to the finished wallboard, i.e. better nail pull resistance, better core/edge hardness, and better handling characteristics, e.g. dust reduction on drilling, cutting and sawing.

EXAMPLE 13

Determining Average Void Size, Wall Thickness and Presence of Densified Reinforced Wall Surface A core sample may be prepared by scoring a wallboard sample to be tested and snapping across the core to separate an appropriately sized sample. Loose debris is then removed, for example, by directing a forced air stream across the scored area. The core sample is then mounted and coated using conventional scanning electron photomicrography techniques.

Average Void Size

Prepare ten photomicrographs at 50× magnification taken at random locations in the core sample. Measure the largest cross-sectional distance across each of the voids in the ten photomicrographs. Add the measured distances and calculate the average maximum cross-sectional distance. This will be the average void size of the sample.

Average Wall Thickness

Prepare ten photomicrographs at 50× magnification taken at random locations in the core sample. Measure the distance between each of the voids intersected by the horizontal and vertical edges of the photomicrograph along the edges. Add all of the distances measured and calculate the average distance. This is the average wall thickness of the sample.

Densified Reinforced Wall Surface

Prepare ten 500× photomicrographs taken at random locations in the core sample. Examine the enlarged voids appearing in these photomicrographs for thick white lines along the edges of the voids, like those identified as feature A in FIG. 15. The presence of these thick white lines indicates the presence of densified reinforcing void wall surfaces in the sample.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of making a light weight gypsum board, the method comprising:
   (A) preparing a gypsum slurry having foam dispersed therein;
   (B) disposing the gypsum slurry between a first cover sheet and a second cover sheet to form a panel;
   (C) cutting the panel into a board of predetermined dimensions; and
   (D) drying the board;
   such that a set gypsum core comprising a gypsum crystal matrix is formed between the cover sheets, the gypsum crystal matrix defining walls surrounding and between air voids within the gypsum crystal matrix, the average thickness of the walls between the air voids being about 30 microns to about 200 microns, the average air void size being less than about 100 microns in diameter, the average wall thickness and air void size measured using three-dimensional imaging acquired by X-ray CT-scanning analysis (XMT), and the gypsum crystal matrix formed such that the set gypsum core has an average core hardness of at least about 11 pounds as determined in accordance with ASTM C-473; and the board having a density of about 35 pcf or less.

2. The method of claim 1, wherein the average air void size is between about 10 microns in diameter and about 100 microns in diameter.

3. The method of claim 1, wherein the walls have an average thickness from about 70 microns to about 120 microns.

4. The method of claim 1, wherein at least a portion of the walls includes reinforced densified wall surfaces.

5. The method of claim 1, wherein the board density is from about 24 pcf to about 33 pcf.

6. The method of claim 5, the slurry further comprising a pregelatinized starch in an amount from about 0.5% to about 10% by weight based on the weight of the stucco, and a naphthalenesulfonate dispersant in an amount from about 0.1% to about 3.0% by weight based on the weight of the stucco.

7. The method of claim 6, the slurry further comprising a trimetaphosphate compound chosen from sodium trimetaphosphate, potassium trimetaphosphate, lithium trimetaphosphate, and ammonium trimetaphosphate, the trimetaphosphate compound being in an amount from about 0.12% to about 0.4% by weight based on the weight of the stucco.

8. A method of making a light weight gypsum board, the method comprising:
   (A) preparing a gypsum slurry having foam dispersed therein;
   (B) disposing the gypsum slurry between a first cover sheet and a second cover sheet to form a panel;
   (C) cutting the panel into a board of predetermined dimensions; and
   (D) drying the board;
   such that a set gypsum core comprising a gypsum crystal matrix is formed between the cover sheets, the gypsum crystal matrix defining walls surrounding and between air voids within the gypsum crystal matrix, the average thickness of the walls between the air voids being about 30 microns to about 200 microns, the average air void size being less than about 100 microns in diameter, the average wall thickness and air void size measured using three-dimensional imaging acquired by X-ray CT-scanning analysis (XMT), and the gypsum crystal matrix formed such that the board exhibits a nail pull resistance to core hardness ratio of from about 4 to about 8, each as determined in accordance with ASTM C-473, when the board is about ½ inch thick; and the board having a density of about 35 pcf or less.

9. The method of claim 8, wherein the average air void size is between about 10 microns in diameter and about 100 microns in diameter.

10. The method of claim 8, wherein the walls have an average thickness from about 70 microns to about 120 microns.

11. The method of claim 8, wherein at least a portion of the walls includes reinforced densified wall surfaces.

12. The method of claim 8, wherein the board density is from about 24 pcf to about 33 pcf.

13. The method of claim 12, the slurry further comprising a pregelatinized starch in an amount from about 0.5% to about 10% by weight based on the weight of the stucco, and a naphthalenesulfonate dispersant in an amount from about 0.1% to about 3.0% by weight based on the weight of the stucco, and a trimetaphosphate compound chosen from sodium trimetaphosphate, potassium trimetaphosphate, lithium trimetaphosphate, and ammonium trimetaphosphate, the trimetaphosphate compound being in an amount from about 0.12% to about 0.4% by weight based on the weight of the stucco.

14. A method of making a light weight gypsum board, the method comprising:
   (A) preparing a gypsum slurry having foam dispersed therein;
   (B) disposing the gypsum slurry between a first cover sheet and a second cover sheet to form a panel;
   (C) cutting the panel into a board of predetermined dimensions; and
   (D) drying the board;
   such that a set gypsum core comprising a gypsum crystal matrix is formed between the cover sheets, the gypsum crystal matrix defining walls surrounding and between air voids within the gypsum crystal matrix, the majority of air voids have a diameter of about 100 microns or less, the average thickness of the walls between the air voids being about 30 microns to about 200 microns, the average wall thickness and air voids measured using three-dimensional imaging acquired by X-ray CT-scanning analysis (XMT), and the gypsum crystal matrix formed such that the set gypsum core has an average core hardness of at least about 11 pounds as determined in accordance with ASTM C-473; and the board having a density of about 35 pcf or less.

15. The method of claim 14, wherein the average air void size is between about 10 microns in diameter and about 100 microns in diameter.

16. The method of claim 14, wherein the walls have an average thickness from about 70 microns to about 120 microns.

17. The method of claim 14, wherein at least a portion of the walls includes reinforced densified wall surfaces.

18. The method of claim 14, wherein the board density is from about 24 pcf to about 33 pcf.

19. The method of claim 18, the slurry further comprising a pregelatinized starch in an amount from about 0.5% to about 10% by weight based on the weight of the stucco, and a naphthalenesulfonate dispersant in an amount from about 0.1% to about 3.0% by weight based on the weight of the stucco.

20. The method of claim 19, the slurry further comprising a trimetaphosphate compound chosen from sodium trimetaphosphate, potassium trimetaphosphate, lithium trimetaphosphate, and ammonium trimetaphosphate, the trimetaphosphate compound being in an amount from about 0.12% to about 0.4% by weight based on the weight of the stucco.

* * * * *